US007636418B2

(12) United States Patent
Anwar et al.

(10) Patent No.: US 7,636,418 B2
(45) Date of Patent: *Dec. 22, 2009

(54) CONTAINER INSPECTION SYSTEM

(75) Inventors: Aijaz Anwar, Stockport (GB); Thomas Bromell, Riyadh (SA)

(73) Assignee: EG&G Middle East, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 12/058,249

(22) Filed: Mar. 28, 2008

(65) Prior Publication Data

US 2008/0260097 A1    Oct. 23, 2008

Related U.S. Application Data

(63) Continuation of application No. 11/004,092, filed on Dec. 3, 2004, now Pat. No. 7,356,116.

(51) Int. Cl.
*G01N 23/083* (2006.01)
*G01N 23/10* (2006.01)

(52) U.S. Cl. .............................. 378/57; 378/64; 378/68; 378/69

(58) Field of Classification Search .................. 378/57, 378/64, 68, 69
See application file for complete search history.

(56) References Cited

U.S. PATENT DOCUMENTS

| | | |
|---|---|---|
| 3,832,545 A | 8/1974 | Bartko |
| 3,980,889 A | 9/1976 | Haas et al. |
| 4,020,346 A | 4/1977 | Dennis |
| 4,239,969 A | 12/1980 | Haas et al. |
| 4,379,481 A | 4/1983 | Juner et al. |
| 4,793,261 A | 12/1988 | Schwaemmle |
| 5,012,917 A | 5/1991 | Gilbert et al. |
| 5,065,418 A | 11/1991 | Bermbach et al. |
| 5,175,756 A | 12/1992 | Pongratz et al. |

(Continued)

FOREIGN PATENT DOCUMENTS

EP    0459648 A    12/1991

(Continued)

OTHER PUBLICATIONS

International Search Report from the European Patent Office, mailed Dec. 6, 2006.

(Continued)

*Primary Examiner*—Allen C. Ho
(74) *Attorney, Agent, or Firm*—Akin Gump Strauss Hauer & Feld LLP

(57) ABSTRACT

An inspection system provides for inspection of cargo containers. A scanning tunnel has an entrance and an exit, a plurality of scanning entrance doors, each having an open position and a closed position, at least one of the plurality of scanning entrance doors interior to the scanning tunnel; a plurality of scanning exit doors, each having an open position and a closed position, at least one of the plurality of scanning exit doors interior to the scanning tunnel. A scanner is adapted to scan the contents of a container inside the scanning tunnel when at least one of the plurality of scanning entrance doors is in the closed position and at least one of the plurality of scanning exit doors is in the closed position. A carrier carries the container through the tunnel.

36 Claims, 41 Drawing Sheets

U.S. PATENT DOCUMENTS

| | | | |
|---|---|---|---|
| 5,195,629 A | 3/1993 | Gottstein et al. | |
| 5,388,684 A | 2/1995 | Peck | |
| 5,493,596 A | 2/1996 | Annis | |
| 5,740,221 A | 4/1998 | Norman et al. | |
| 5,754,617 A | 5/1998 | Itoh | |
| 5,838,759 A | 11/1998 | Armistead | |
| 5,958,336 A * | 9/1999 | Duarte | 422/24 |
| 5,994,706 A | 11/1999 | Allen et al. | |
| 6,058,159 A * | 5/2000 | Conway et al. | 378/68 |
| 6,266,393 B1 | 7/2001 | Ein-Gal | |
| 6,285,030 B1 | 9/2001 | Williams et al. | |
| 6,430,255 B2 | 8/2002 | Fenkart et al. | |
| 6,663,280 B2 | 12/2003 | Doenges | |
| 6,922,461 B2 | 7/2005 | Kang et al. | |
| 6,972,693 B2 * | 12/2005 | Brown et al. | 340/907 |
| 7,072,434 B1 * | 7/2006 | Tybinkowski et al. | 378/4 |
| 2003/0215054 A1 | 11/2003 | Fenkart et al. | |
| 2004/0179647 A1 | 9/2004 | Zhao et al. | |

FOREIGN PATENT DOCUMENTS

| | | |
|---|---|---|
| GB | 2110037 A | 6/1983 |
| GB | 2368764 A | 5/2002 |
| JP | 04022897 | 1/1992 |
| JP | 2001233440 A | 8/2001 |
| JP | 2003287507 | 10/2003 |
| WO | 2004010162 A2 | 1/2004 |

OTHER PUBLICATIONS

International Search Report from the European Patent Office, mailed Mar. 13, 2007.

* cited by examiner

CONTAINER INSPECTION SYSTEM

CROSS-REFERENCE TO RELATED APPLICATIONS

The present application is a continuation of U.S. application Ser. No. 11/004,092, filed Dec. 3, 2004, which is incorporated herein in its entirety for all purposes.

STATEMENTS REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

The present invention relates to the field of inspection systems and in particular, to a system for inspection of containers.

2. Description of the Related Art

Travelers are familiar with carry-on luggage inspection systems. These systems typically allow a screener to X-ray carry-on luggage and other traveler items that the traveler places on a conveyor belt for inspection. Flexible curtains typically shield the entrance and exit of an X-ray scanning chamber. While in the chamber, a low-energy X-ray source irradiates the luggage, presenting an image on a display for the screener. The system typically requires the luggage to be stationary while being irradiated. Many airports use similar systems for checked luggage, in addition to carry-on items.

However, such systems are not typically suitable for screening large cargo containers or container transporters, such as large trucks. Low-energy X-rays may not be capable of penetrating the cargo containers or transporters. Further, conveyor belts used by luggage screening systems are typically not suitable for supporting the weight of fully loaded cargo containers or transporters. Previous techniques for screening of such cargo containers include personal inspection by an inspector and metal detection technology' as well as detection of contraband by high-energy X-ray systems.

The assignee of the present application has implemented a truck-transported cargo container inspection system for a customs agency in China. A radiation shield door at each end of a scanning tunnel blocks radiation from escaping the tunnel. At an entrance location, operators drive trucks onto intelligent platens mounted on rails, after which the driver exits the truck and walks to the exit around the tunnel. When the entrance door opens, the platen carrying the truck moves into the tunnel then stops and waits for the entrance door to close. The platen then starts moving again and passes by the scanner, which produces a display for the system operators. After scanning, the platen waits for the exit door to open, then exits, after which the exit doors close. The driver then returns to the truck, drives off the platen, and exits the area. The platen then returns to the loading area for a future truck. However, throughput of this system is limited because of the need to start and stop the platen to wait for the entrance door and the exit door to open and close, with only one platen allowed in the tunnel at a time. In addition, the platens, which are self-propelled intelligent platens coupled to complex power delivery systems by trailing electrical leads or moving electrical pickup systems, can present reliability concerns.

BRIEF SUMMARY OF THE INVENTION

Briefly, one embodiment of an inspection system comprises: a scanning tunnel having an entrance and an exit; a plurality of scanning entrance doors, each having an open position and a closed position, at least one of the plurality of scanning entrance doors interior to the scanning tunnel; a plurality of scanning exit doors, each having an open position and a closed position, at least one of the plurality of scanning exit doors interior to the scanning tunnel; a scanner, adapted to scan the contents of a container inside the scanning tunnel when at least one of the plurality of scanning entrance doors is in the closed position and at least one of the plurality of scanning exit doors is in the closed position; and a carrier, adapted to carry the container through the tunnel.

In a further embodiment, the carrier is unpowered. In a yet further embodiment, a plurality of friction drive units are operatively coupled to the carrier for moving the carrier through the scanning tunnel. In another embodiment, the carrier is self-propelled.

In a further embodiment, a conveyor system conveys the carrier through the tunnel. In a yet further embodiment, the conveyor system returns the carrier from the exit to the entrance exterior to the tunnel.

BRIEF DESCRIPTION OF THE SEVERAL VIEWS OF THE DRAWINGS

A better understanding of the present invention can be obtained when the following detailed description of various disclosed embodiments is considered in conjunction with the following drawings, in which.

DETAILED DESCRIPTION OF THE INVENTION

Although the following is presented in terms of an X-ray inspection system, all references to X-rays should be understood as exemplary and illustrative only, and other types of radiation beams and scanning systems can be used according to the present invention. Further, the terms "cargo" and "trucks" may be generally referred to as containers, including, but not limited to, self-propelled cargo-carrying apparatus and containers designed to be transported by other modes of transport, as well as self-contained cargo.

A typical cargo X-ray inspection system according to one embodiment consists of five main elements: a scanning building or tunnel, an X-ray system, a motion system, an information-site control system and ancillaries. In a typical embodiment, the system automatically conveys containers through the motion system into a scanning chamber where the container passes through a highly collimated narrow fan shaped X-ray beam at a constant speed. A sensor array of crystals coupled to sensitive photodiodes detects X-rays that pass through the containers. The sensor array is in communication with a digitizer, which digitizes the signals communicated by the sensor array. One or more inspection stations may then use image-processing techniques to enhance the digitized signals to express radiographic images of the inspected carriers. Based on visual analysis of the images, the system operator decides whether to call for further intrusive inspection of the inspected container.

According to one embodiment, a five-carrier motion system is used to carry individual or multiple containers for scanning in the inspection system. In one embodiment, the inspection system can inspect 50 containers per hour. The modularity of the system's basic design allows the motion system to continue full operation with the remaining carriers if one or more carriers are removed for maintenance. Although described herein using five carriers, any number of carriers can be used as desired.

The inspection system may include a number of safety features that protect both the operators and the general public. For example, in one embodiment, the scanning building prevents harmful radiation from being emitted from the enclosure.

Figure 1:
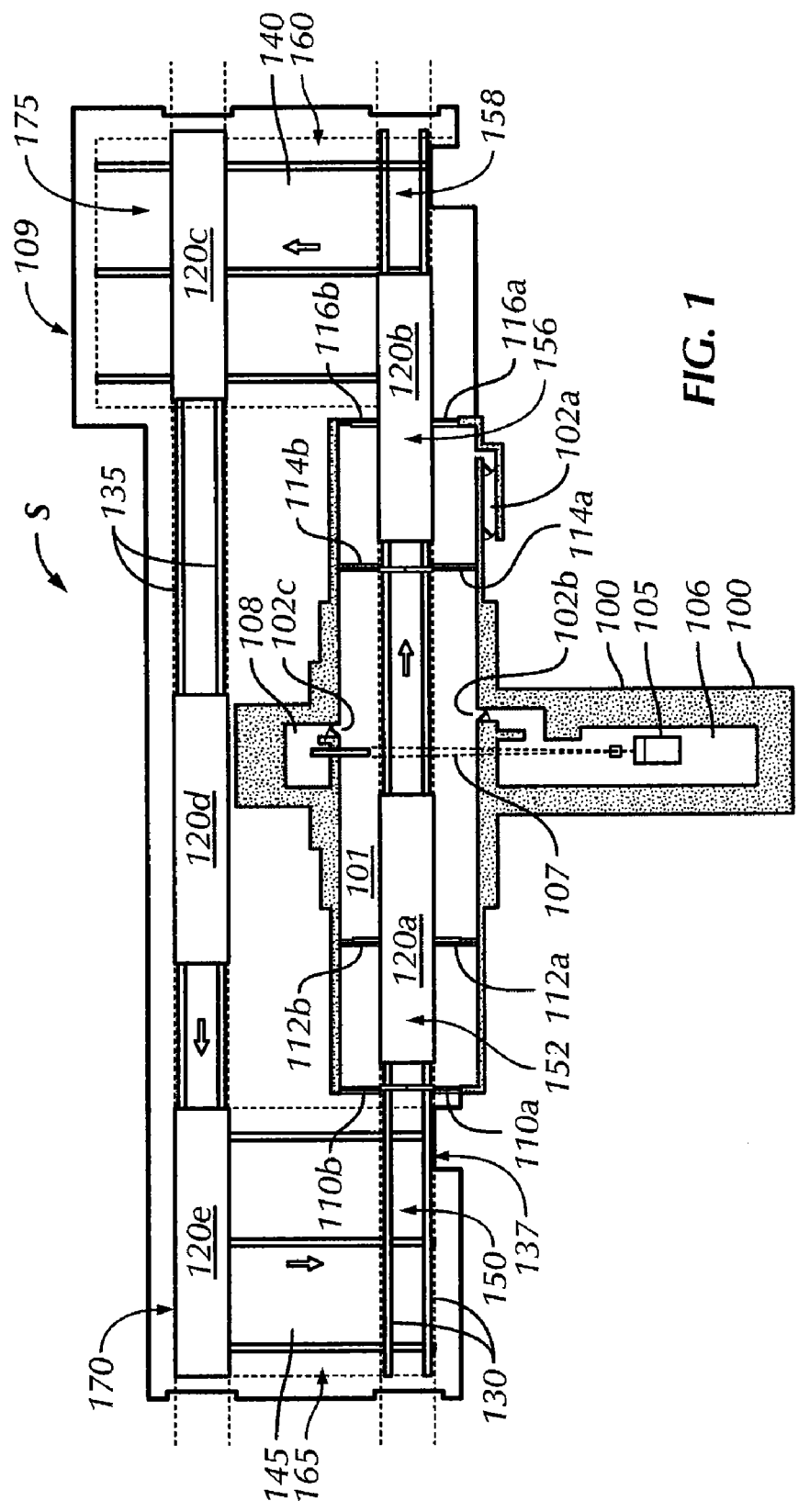
FIG. 1 is a plan view illustrating a container scanning system according to one embodiment.

FIG. 1 is a plan view of a container inspection system S according to one embodiment. A scanning inspection building or tunnel 100 allows inspection of containers with high-energy X-rays without emitting harmful radiation from the building 100. An X-ray generation room 106 houses an X-ray generator 105, typically a linear accelerator (LINAC), although other types of X-ray generators can be used. A radiation beam 107 from the X-ray generator 105 traverses a scanning chamber 101 of the tunnel 100 as shown and excites detectors in a linear array system (LAS) room 108 as described in detail below. Personal access doors (PADs) 102 allow controlled access to the scanning chamber 101 (PAD 102a), as well as to the X-ray generation room 106 (PAD 102b) and LAS room 108 (PAD 102c), for maintenance and other purposes, as described in detail below. A security fence 109 surrounds at least a portion of the system S, to prevent unauthorized access to the facility.

Four doors 110, 112, 114, and 116 shield the scanning chamber 101, reducing X-ray emission from escaping on either end of the tunnel 100. Although as shown in FIG. 1, doors 110, 112, 114, and 116 comprise split doors 110a-110b, 112a-112b, 114a-114b, and 116a-116b that separate to open, other types of doors can be used, including unitary doors. Although as described below, the door sections 110a-110b, 112a-112b, 114a-114b, and 116a-116b move from side to side to open and close, other door geometries can be used.

Two sets of rails or tracks 130 and 135 provide for movement of a plurality of carriers 120, shown in FIG. 1 as carriers 120a-120e, in a longitudinal direction, together with transverse rails 140 and 145, allowing the carriers 120 to circulate through the system S. Although FIG. 1 shows transverse rails 140 and 145 as comprising three rails each, other transverse rail configurations can be used. The carriers 120 are described in detail below. Various stations or locations around the system S are also indicated in FIG. 1. At process station 1 (150) a loaded carrier 120e prepares to enter the tunnel 100 when doors 110a and 110b open. A linear drive or motion system 137, described in more detail below, then moves the loaded carrier 120e into the tunnel 100. At process station 2 (152) the container on the loaded carrier 120a is shown inside the tunnel 100 and the doors 110a-110b can then be closed. At process station 3 (154) the container is scanned by the X-ray beam 107 generated by X-ray generator 105. At process station 4 (156) the scanned container exits the tunnel 100, stopping at process station 5 (158). The carrier 120b then traverses buffer station 160 until the carrier 120c reaches unloading station 175, where the inspected container is off-loaded and leaves the system S. The now-empty carrier 120d returns by track 135 to load station 170, where another container can be loaded onto the carrier 120e. The loaded container moves through buffer station 165 to the process station 150 to prepare for inspection.

Not shown in FIG. 1 for clarity of the drawing are other buildings or rooms used to house equipment, display stations, maintenance and repair facilities, and offices. These may be situated within the fenced area of the system S or elsewhere as desired. Also not shown in FIG. 1 for clarity of the drawing are air-conditioning and heating systems and power generation and distribution systems used to generate and deliver electrical power to the several elements of the System S.

Figure 24:
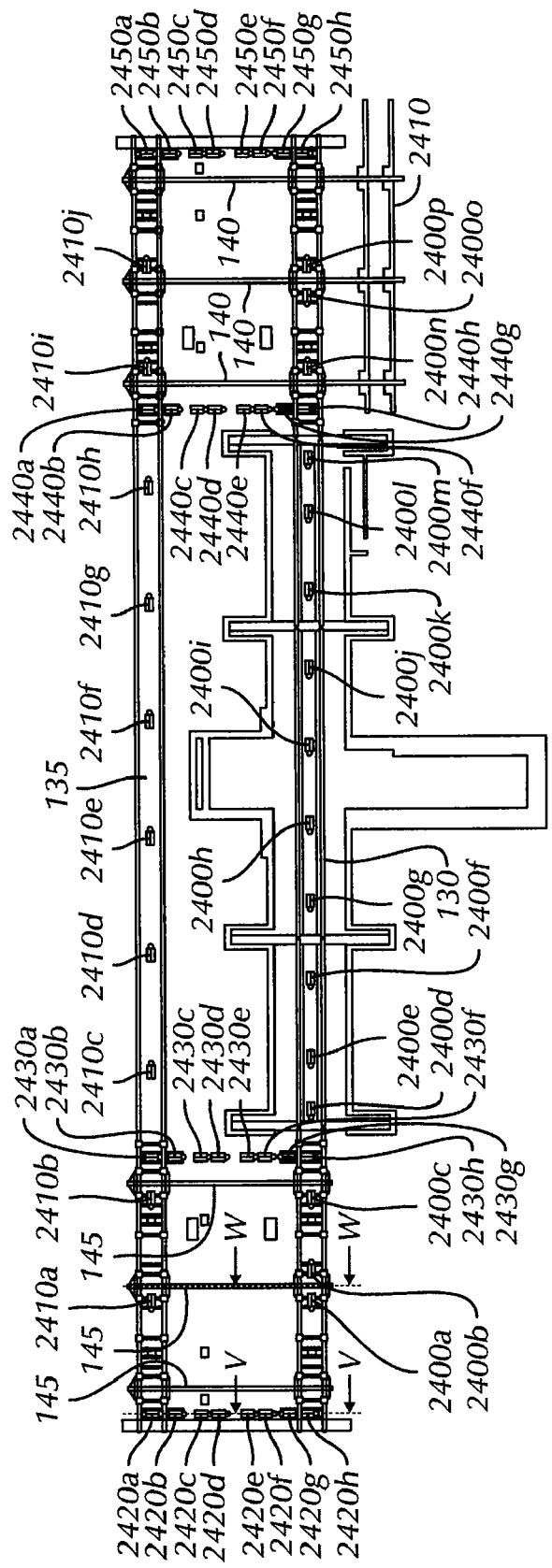
FIG. 24 is a top view of the system S, illustrating an exemplary placement of motor drives.

In one embodiment, as shown in FIG. 1, transverse rails 140 extend beyond longitudinal rails 135, to allow for a carrier 120 to be moved from service. In other embodiments, rails 140 extend as shown in FIG. 24, to allow the carrier 120 to move onto another section of longitudinal rails 2410, for removing and maintaining the carrier 120. Other configurations for removing carriers 120 from the main path for maintenance can be provided.

Access roads typically allow trucks and other container transporters to enter and exit the area. Alternatively, external railroad tracks can provide the ability to deliver and pickup containers from the inspection system S, allowing inspection of rail cargo containers. Other transport modes for transporting containers to and from the system S can be used as desired.

For truck-transported containers, the driver will dismount the truck after driving the truck onto one of the carriers 120 at the loading station 170, then walk to the unload station 175, reenter the truck after the inspection, and exit the area. Should the X-ray inspection determine the need for further inspection or other action that action or actions can be performed before the driver exits the area.

Figure 2:
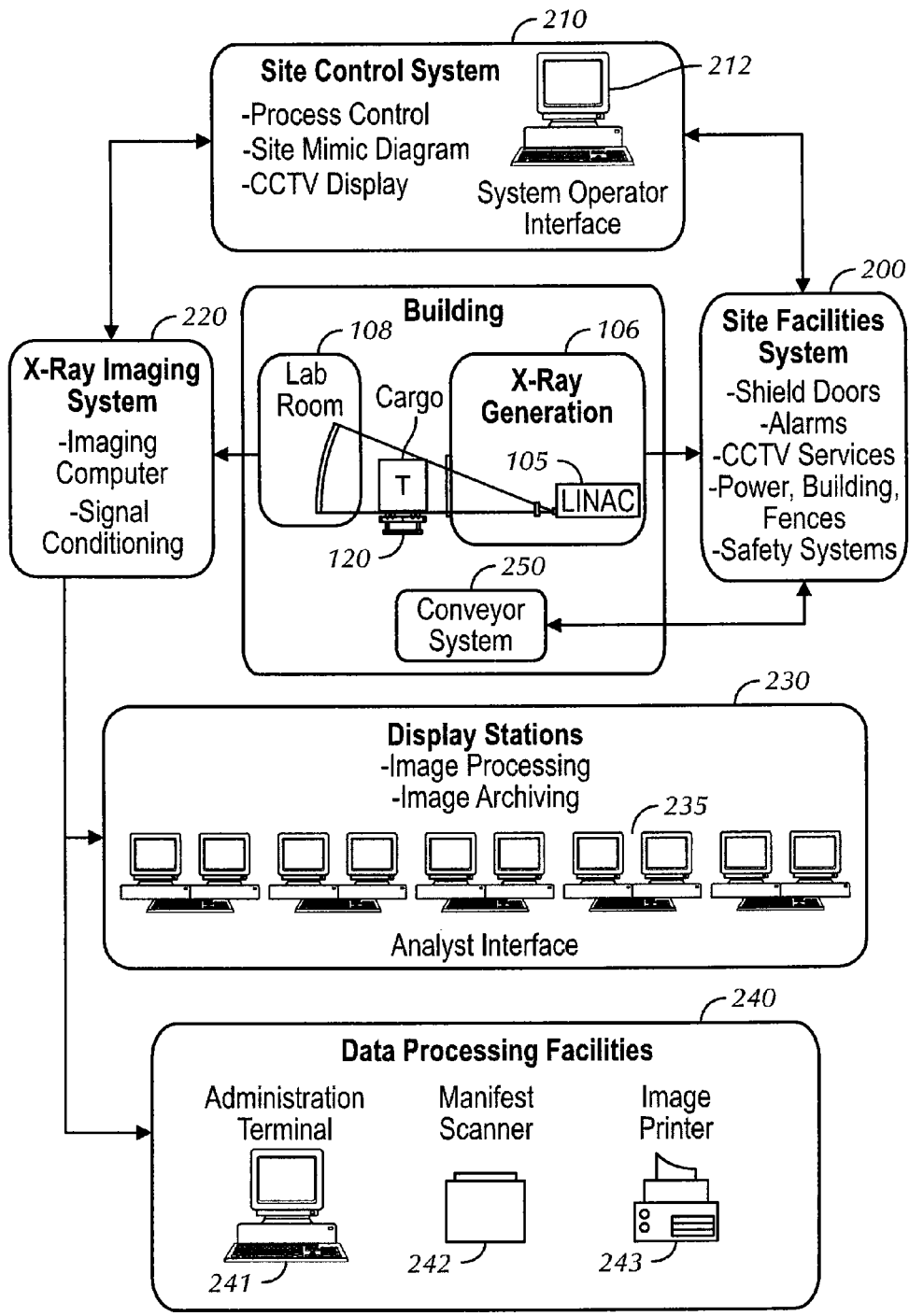
FIG. 2 is a schematic diagram illustrating interconnection between several subsystems of the scanning system of FIG. 1.

FIG. 2 is a schematic diagram of an inspection system according to one embodiment, showing how major subsystems of the system S can be interfaced. Site facilities 200 may include shield doors 110, 112, 114, and 116, alarms, closed circuit TV (CCTV), services, power building, fences, and safety systems among other features. A site control system 210 provides a system operator interface 212 for overall control of the site, as well as process control and CCTV displays. The site facilities 200 also interface with the X-ray generation room 106, including the LINAC 105, the conveyor system 250, and the site control system 210. An X-ray imaging system 220 under the control of the site control system 210 captures images from the LAS room 108 detectors and performs signal conditioning on the images, using any desired signal conditioning technique, such amplification or noise filtering. The X-ray imaging system 220 then transmits those images to the analyst interface 230, which provides a plurality of display stations 235 for analysts to perform image processing and archiving. The X-ray imaging system 220 and analyst interface 230 also interface with data processing facilities 240, which include an administrator terminal 241, manifest scanner 242, and image printer 243, as described in more detail below. One skilled in the art will recognize that the system diagram shown in FIG. 2 is illustrative and exemplary only, and other elements and arrangements of elements can be used.

The design and construction of the tunnel 100 is guided by the International Commission on Radiological Protection (ICRP) recommended limits for the general public or other desired radiation regulations or guidelines. Structural elements of the tunnel 100 are built free of cracks and fissure using concrete density of about 2350 Kg/m3 compacted to eliminate voids, based on the ICRP recommended limit of 1 mSv/year. The floor slabs of the building 100 are highly leveled to maintain alignment of the X-ray source 105, collimators, rail tracks and LAS 108. The X-ray room 106 is separated from the scanning chamber 101 by a radiation shield wall in one embodiment. Entry to the X-ray room 106 can be controlled through an interlocked Personnel Access Door (PAD) 102b located at the entrance of a labyrinth from the scanning chamber 101. The labyrinth shields the PAD 102b from scattered or leakage radiation.

Entry to the scanning chamber 101 may be accomplished via PAD 102a located at the exit or entry end of the building 100, shown in FIG. 1 at the exit end. Other locations for the PAD 102a can be used as desired.

Suitable techniques can be used in the area of LAS 108 to remove water from the lower floor level generated by condensation that may have formed on collimator outer faces. Floor ducts and wall boxes can be provided where necessary for routing cables and hoses.

Transporter loading and unloading ramps (not shown) can be constructed at the entrance and exit areas of the inspection systems to allow safe transporter movement and to support a weight up to a desired limit. In one embodiment, that limit is 60 tons.

The entire facility is preferably fenced to a desired height to prevent casual entry. In one embodiment, the fence is approximately 2 meters high; however, other fence heights can be used. A driver's walkway guides truck drivers from the entry to the exit end of the system S.

A security barrier may also be installed at entry of the facility. The barrier can be located at the top of the loading ramp immediately prior to carrier entry. A security barrier can also be installed at the exit of the facility. The barrier can be located at the top of the unloading ramp immediately prior to carrier exit. In one embodiment, the barriers are a minimum height 2.5 meters, but can be any desired height.

Each barrier can have sensors fitted that indicate the status of the relative barrier so that if any obstruction is present the sensors can sense this obstruction and return the barrier to the up position. The sensors feed back the status to an X-ray system controller (XSC) of the site control system 210 so that the XSC can control the overall flow with other interlock signals. The XSC will control the operation of these barriers.

An axle count system, if desired, can also be fitted at the entrance and exit of the inspection system S immediately before the barriers or directly underneath the barriers so that the system S can count the trucks on and off the facilities. In one embodiment, the axle count system is designed such that when a truck drives over it a signal will be generated and sent back to a system control station of the site control system 210. In another embodiment, sensors can be used to confirm entry and exit of trucks from the facility instead of an axle count system.

At each end of the tunnel 100, radiation shield doors 110 and 116 are fitted. Preferably, the doors are constructed to minimize the radiation levels immediately in front of the doors, including scatter leakage at the top and bottom of each door. In one embodiment, the shield doors 110 and 116 are constructed from steel having a density of about 7800 Kg/m3 minimum and of such a thickness that the radiation leakage does not exceed the ICRP recommended levels for the general public. Likewise, interior entrance door 112 and interior exit door 114 are similarly constructed and placed interior to the tunnel 100, such that a carrier 120 between doors 112 and 114 will have clearance on both ends of the carrier 120. Other door constructions can be used.

All areas of the building or tunnel 100 can be equipped with air conditioning. In one embodiment, the scanning chamber 101 can be un-air conditioned. In one embodiment, all air conditioning units have a fresh air make up of about 10%; however, other fresh air make up levels can be used. A fan and air vent system can be installed between the X-ray room 106 and scanning chamber 101 to prevent ozone build up in the X-ray room 106. The rate of air transfer can be one room volume per hour minimum or any other desired rate.

The X-ray control, power distribution, X-ray room 106, and LAS room 108 can be controlled to maintain a temperature between 10° C. to 35° C. The X-ray control room has an aperture fitted in the wall to allow the LINAC hoses and other cables to be routed from the outside. In one embodiment an aperture, preferably 460 mm by 460 mm, can also be installed in the wall between the LAS room 108 and the scanning chamber 101. A louvered vent can also be installed in the LAS access door 102c for ventilation purposes.

Figure 3:
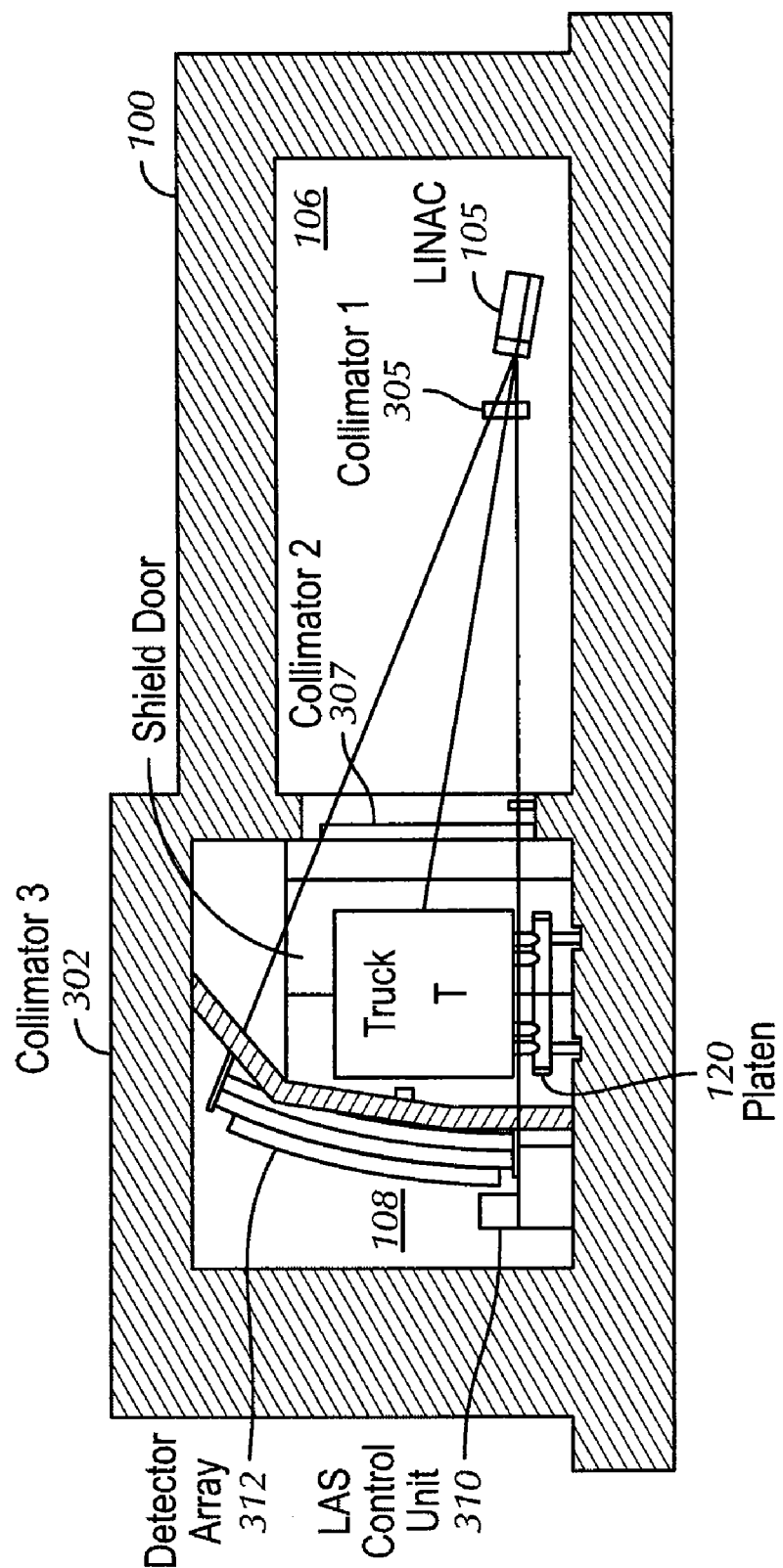
FIG. 3 is elevation view illustrating a scanner subsystem for a container scanning system according to one embodiment.

FIG. 3 shows the arrangement of the LINAC 105 and LAS 108 in the X-ray tunnel or building 100. As shown in FIG. 3, truck T and its cargo are being irradiated by X-rays generated by the LINAC 105.

The radiation source in one embodiment is a high-energy 9 MeV linear accelerator (LINAC) 105, which has its own control/drive electronics, and can emit 3000 Rads/min@ 1 meter. The LINAC 105 is controlled by a site X-ray control system (XCS) via a set of hardware and software interlocks intended for safe operation. The 9 MeV LINAC system 105 consists of an X-ray head (0.001% low leakage), a modulator, a water chilled pump stand, a transformer, a control rack, and a voltage regulator. All equipment with the exception of the X-ray head are preferably positioned outside of the X-ray room 106. This 9 MeV setting is typically used for all containers and provides photons of sufficient energy and intensity to penetrate the densest containers and cargos. The actual irradiation level per inspection is expected to be less than 50 μSv. However, other LINAC energy settings can be used as desired, as well as other variations based on declared cargos.

The LINAC 105 can be a standard industrial unit, designed for continuous use. A re-circulating chiller can be used to supply cooling water to the X-ray head. The LINAC 105 can be mounted on a platform that will allow alignment of the X-ray head with the collimators 302, 305, and 307 (as shown in FIG. 3) and LAS 108. The LINAC 105 mounting platform can be secured to a smooth rendered concrete floor with normal concrete fixings (such as rag or Rawl bolts).

In one embodiment, the Linear Array System (LAS) 108 consists of a linear array 312 of detector elements mounted directly onto the rear face of Collimator 3 (302). Each detector element comprises a scintillating crystal and photodiode. The array 312 in one embodiment consists of about 1600 such elements on a 4.6 mm pitch, forming an array of total height of about 7.5 meters. The number and pitch of the elements and array height are illustrative and exemplary only, and other numbers, pitches, and heights can be used. Each crystal is individually screened and optically coupled to a separate photodiode. The signal from each photodiode is integrated and digitized within the module, minimizing signal transmission errors and noise intrusion.

The rear face of the collimator 302, on which the detector elements 312 are mounted is approximately arc-shaped and aligned at a perpendicular angle to the radiation from the LINAC 105 to improve the clarity of the image formed. Other configurations and techniques for improving the clarity of the image can be used.

The entire array 312 can be housed in a lightproof housing that also provides for air ducting for a forced-air cooling system. A stand-alone control unit 310 that interfaces with the X-ray system controller controls the complete array 312.

As show in FIG. 3, according to one embodiment, there are three collimators used to control the shape of the X-ray beam. Other numbers, placements, and arrangements of collimators can be used. Collimators 1 (305) and 2 (307) are used to form a narrow fan shaped beam that the truck T passes through when being scanned. The beam is only 5.5 mm wide when it leaves collimator 2 (307), which minimizes the radiation dose experienced by the item being inspected. The beam width is illustrative and exemplary only and other beam widths can be used as desired.

Collimator 3 (302) has two main functions. Firstly, it is thick enough to protect the detector electronics from the X-ray beam 107. Secondly, collimator 302 is designed to prevent X-rays that have been scattered by the cargo from reaching the detectors, which would otherwise blur the image. In order to prevent image blurring, collimator 3 (302) has a 4.6 mm wide slot that is over 800 mm deep over its entire length. This slot size is exemplary and illustrative only and other sizes and depths can be used.

In one embodiment, a 5-carrier conveyor system is used to offer a smooth throughput of 50 containers per hour, assuming an efficient queuing and loading operation. However, other numbers of carriers and throughput rates can be provided as desired. The conveyor system transports the container and its cargo through the X-ray beam. The conveyor system is controlled by the site X-ray control system (XCS); however, the conveyor system contains a degree of built-in intelligence so that the control structure remains simple. The conveyor system in one embodiment can carry containers that have a maximum dimension of 18 m in length, 3.5 m in width and 4.6 m in height with a maximum gross weight of 60 tons.

The maximum axle weight of the trucks or other wheeled containers is limited to 12 tons. Other conveyor system and container dimensions and weight limits can be used. Although described herein in terms of single trucks or containers, each carrier can carry multiple containers and their cargo if desired, allowing inspection of multiple smaller containers simultaneously.

The carriers 120 used by the conveyor system to carry the containers through the tunnel 100 are typically flatbed platens. The platen frames are of a plain carbon steel (such as defined by the BS 4848 and EN 10155 or other suitable standards) construction and are covered on the top surface with a steel plate thus providing a flat working surface. Other grades of steel can be used as desired.

In one embodiment, a standard railway track is used to guide the carriers 120 forming a loop passing through and around the building. The tracks can be mounted on sole plates to aid leveling and provide greater load distribution. Railway technology can be used for laying guide rails. An extra area of rail (not shown) is preferably provided to allow carriers to be taken out of the flow of the system S for maintenance purposes.

The carriers 120 comprise a platform with a hollow section frame around the periphery of the platform. The platform will have flanged wheels (arranged as pairs) for longitudinal travel and smaller wheels for transverse travel. Other wheel types can be used as desired. The carrier platform and frame can be cleaned and blasted in accordance with the British Standard BS 5493 "code of practice for protective coating of iron and steel structures against corrosion" or other desirable standard and painted with a two-pack coating or equivalent.

In one embodiment, track transfers are provided for the system S at stations 150, 158, 175, and 170. The purpose of the track transfers is to transfer the carrier from longitudinal movement to cross movement and vice-versa. This is achieved by raising and lowering the appropriate tracks to the correct wheels. The raise and lower functions can be carried out by mechanical means using standard 3-phase electrical motors.

Each transfer system can sustain a load equivalent to the maximum allowable load. In order to provide stability in the X-Y planes, a steel fabricated structure can be used to support the rails. Side restraints can also be provided to prevent undesired side movements.

In a further embodiment, the carrier loading station 170 can be fitted with a load cell system mounted under the carrier lift system enabling the container to be weighed prior to loading into the scanning system. The fabricated track transfer structure is duly shot-blasted and painted in accordance with BS 5493 or other desired standard.

Lowerators can be used at stations 150, 158, 175, and 170 to raise and lower the carriers 120 instead of raising and lowering the tracks. In one embodiment, the longitudinal tracks 135 are elevated 60 mm above the transverse tracks 145, the transverse tracks 145 are elevated 60 mm above longitudinal tracks 130, and longitudinal tracks 130 are elevated 60 mm above transverse tracks 140. The lowerator at the load station 170 lowers the carrier 120 and the container carried by carrier 120 onto the transverse tracks 145 from longitudinal track 135. After transverse movement of the carrier 120, the lowerator at load station 150 lowers the carrier 120 from the transverse tracks 145 onto the longitudinal tracks 130. The carrier 120 then moves along longitudinal track 130 for scanning. After scanning is complete, the lowerator at unload station 158 lowers the carrier 120 from the longitudinal tracks 130 onto the transverse tracks 140. The carrier 120 then moves along the transverse tracks to unloading station 175. After the container carried by the carrier 120 is unloaded, the lowerator at the unloading station 175 raises the carrier 120 onto the longitudinal tracks 135 for return along tracks 135 to loading station 170 for reuse with another container. Thus the lowerators at load stations 170 and 150 and unload station 158 each lower loaded carriers 120 by 60 mm, while the lowerator at unload station 175 raises unloaded carriers 120 by 180 mm to recirculate the carriers 120. This configuration allows securely lowering fully loaded carriers 120, raising only unloaded carriers 120. The relative elevations and arrangement of lowerators is exemplary and illustrative only and other relative elevations and arrangements of lowerators can be used. The lowerators and their method of operation are discussed in more detail below.

A drive system provides power to drive the carriers 120. Drive power to the carriers 120 can be provided by friction drives using 3-phase electrical geared motors, which can be mounted at a number of strategic positions around the periphery of the guide rails 130 and 135. Any desired positioning of the friction drives can be used for movement of the carriers 120.

Steel hubbed rubber wheels can be connected to the geared motor units that provide the friction drive. Each motor unit can have its own inverted control thus providing flexibility of speed and acceleration. The rubber wheels then engage the carriers 120 to move the carriers 120.

In one embodiment, an independent friction driven encoder can be positioned to engage the carriers 120 in the area where they are being driven past the X-ray beam 107. This encoder can be used to regulate the carrier speed through the X-ray 107 and also provide feedback to the X-ray system. In another embodiment, an independent speed measuring device, such as a laser speed measurement device, can be used to confirm the carrier speed. Other types of speed measurement devices can be used.

In other embodiments, other types of drive systems can be used. For example, a motor drive system mounted on the carriers 120 can provide self-propelled carriers, which may require additional electrical power distribution elements.

The shielding door leaves 110a-110b, 112a-112b, 114a-114b, and 116a-116b can be fabricated from plain carbon steel plate and their thickness is sized to provide adequate personnel protection from radiation outside the X-ray tunnel 100. In one embodiment, each door 110, 112, 114, and 116 comprises two electrically driven trolleys with which the two halves 110a-110b, 112a-112b, 114a-114b, and 116a-116b of the doors 110, 112, 114, and 116 are mounted. To prevent undue movement in the horizontal plane, the doors 110, 112, 114, and 116 can have floor mounted guide rails. In another embodiment, the doors 110, 112, 114, and 116 are unitary doors.

The doors 110, 112, 114, and 116 can be powered using positive drives and electric motors controlled via a motion control programmable logic controller (PLC). A separate push button control can be provided to operate the doors in a manual mode. In the event of a power failure, a mechanical recovery system can be provided. The doors 110, 112, 114, and 116 can be grit blasted and painted yellow with black stripes using a two-pack paint system or any other desired color or colors to indicate a radiation hazard area.

An electrical control system for the inspection system S can include traffic control interfaces and barrier drive units, an carrier weight load cell interface, a control logic system, carrier drive starters and variable speed drive units, carrier lift control units, shield door drive units and safety interlocks, X-ray equipment interfaces and safety interlocks, an operator interface SCADA (Supervisory Control and Data Acquisition) system or similar system, power distribution from the main supply panel, proximity switches, limit switches, safety light curtains and emergency stops, and cable installation associated with the above. In one embodiment, the control logic system is an Allen Bradley ControlLogix PLC. Other control logic systems, such as a Seimens Control System, can be used.

The system can be powered from a 3-phase 380-480 VAC supply and all power requirements are preferably derived from the incoming supply. A main control panel containing the power distribution and PLC can be fitted with cooling fan and filters. The control panels can be housed under cover in a temperature-controlled environment.

Motor sizes are designed to meet the load and acceleration requirements of the system. In one embodiment, all motors can be controlled by Allen Bradley 1336 Impact Adjustable Frequency Drive Units or their equivalent. In another embodiment, Siemens motors can be used. These will allow ambient operating temperature range of 0-50 C, speed adjustment directly from the PLC or SCADA via a communications network, and motor overload protection.

Hardwired interlock protection is preferably provided to prevent the X-ray unit 105 from activating until at least one of entrance shielding doors 110 and 112 and at least one of exit shielding doors 114 and 116 are closed. Locks to prevent the PADs 102 opening while the X-ray unit 105 is activated can be provided via a key exchange system or other desired interlocks.

The PLC control system can be based on the Allen Bradley ControlLogix range of equipment or any other equivalent desired logic system, such as a Siemens system. A communication network can allow communication between the PLC, I/O modules, load cells, motor controllers, SCADA and PLC programming terminals and the system operator computer terminal, as described below.

An operator interface 212, can allow the operator to control and monitor the carrier handling system from on-screen buttons and displays, providing access to the handling system status information, set points and fault information. A printer can be included if system information or faults are to be printed. Any SCADA or HMI (Human Machine Interface) system can be used for the operator interface 212. In one embodiment, the operator interface 212 is based on the Allen Bradley RSView 32 SCADA package. In another embodiment, the operator interface 212 can be a system provided by a Siemens or other equivalent system.

Figure 4:
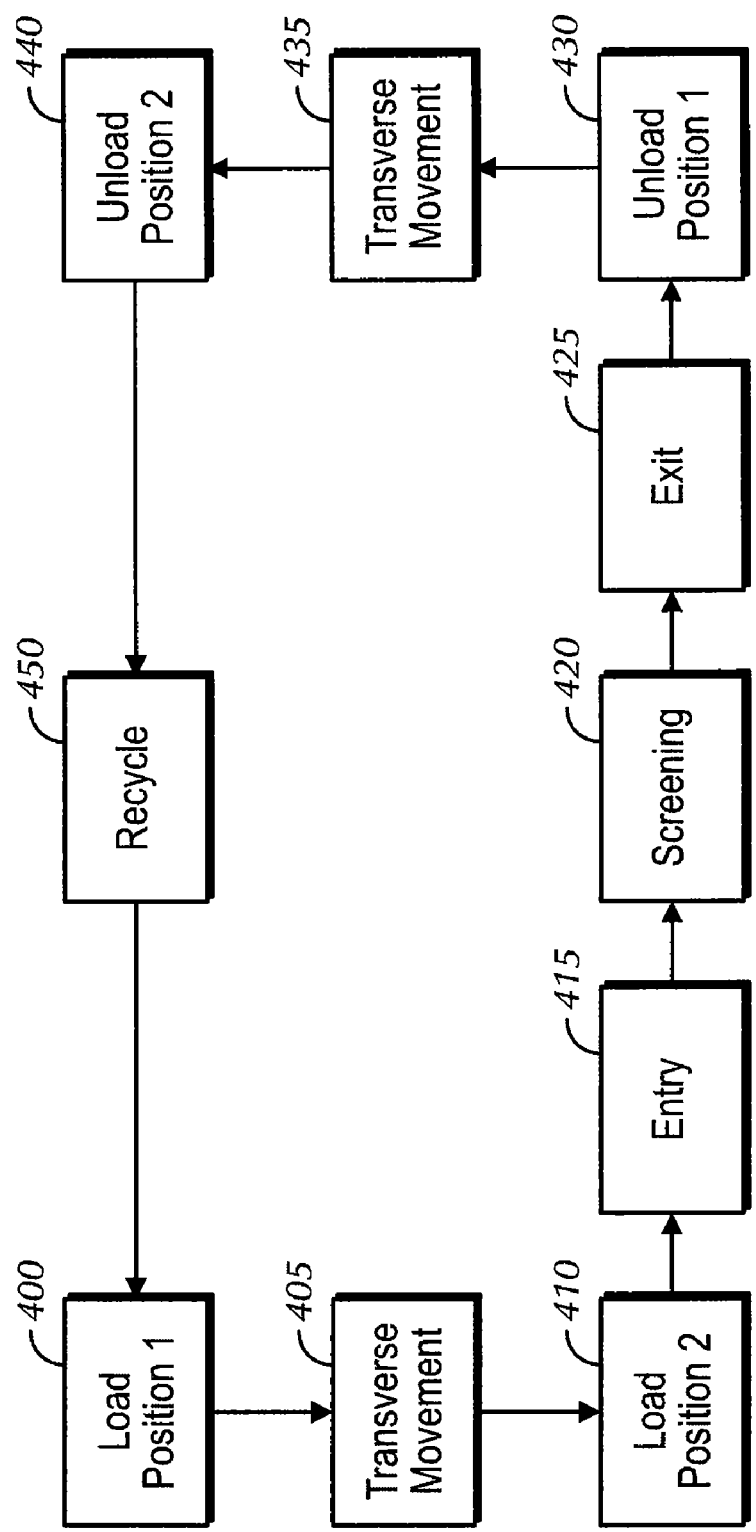
FIG. 4 is a block diagram illustrating carrier movement through an embodiment of a container scanning system.

FIG. 4 is a block diagram illustrating movement of carriers 120 around the system S. Containers are loaded onto an empty carrier 120 at load position 400, corresponding to the load station 170 of FIG. 1. Once loaded, the carrier 120 will move on transverse tracks 145 as shown in block 405, to load position 410, corresponding to process station 150 of FIG. 1. When door 110 opens, carrier 120 moves into entry position 415, corresponding to process station 152 of FIG. 1. Without stopping, carrier 120 continues to move as door 112 opens, allowing entry to the screening area 420 in the screening chamber 101, while door 110 closes. Once door 110 closes, if one of doors 114 or 116 is closed, the carrier 120 can continue to move without stopping through the screening area 420 and beam 107. In one embodiment, the carrier 120 once entering entry area 415 moves at a constant nominal scanning speed of 0.5 m/s±5%, until exiting the tunnel 100. In another embodiment, the carrier 120 moves at 1 m/s until it reaches the beam 107, then slows to 0.5 m/s while being scanned, then accelerates back to 1 m/s to exit the tunnel 100. Other speeds can be used. Non-stop movement allows higher throughput by avoiding the need to reaccelerate a stopped carrier to the desired scanning speed.

A number of alternative methods of operation can be provided to allow operation of the motion system at a reduced capacity in the event of breakdowns. For example, instead of recirculating carriers 120, forward and backward movement of the carriers through tunnel 100 can be used, at a correspondingly lower throughput rate.

The normal mode of operation of the inspection system S is described below with respect to FIGS. 5-9. The indicated actions are illustrative and exemplary only, and other actions and order of actions can be performed.

Figure 5:
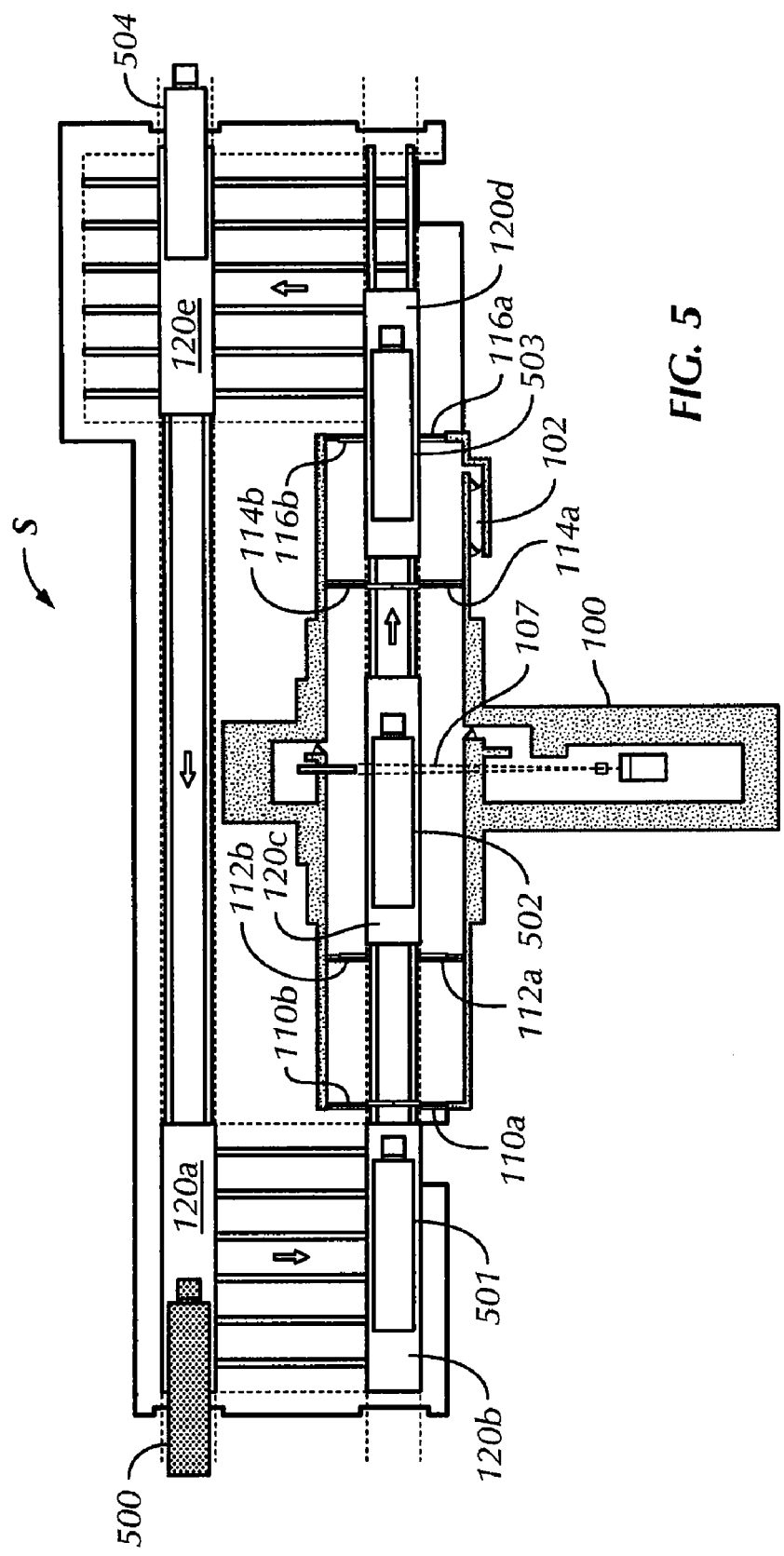
FIGS. 5-9 are plan views illustrating movement of a truck carrying cargo through the container scanning system of FIG. 1.

First, a transporter, such as a truck 500 drives to the barrier at load position 170. A traffic light and barrier system controls the transporters entering the facility. The driver then drives the truck 500 onto carrier 120a, as shown in FIG. 5.

At an appropriate point in the sequence for the preceding carrier, the system controller will raise the entry barrier, thus indicating to the driver to drive the transporter onto the loading area 170 of the conveyor system. The transporter can be weighed prior to or after driving onto the loading area 170.

Once a transporter or container is loaded onto carrier 120a, the driver leaves the transporter and goes to register the transporter's cargo with a site administrator. The administrator enters any desired information about the container or cargo onto an electronic data processing (DP) form on a data entry terminal 1060, described below with respect to FIG. 10. The administrator also produces a scanned image of the cargo manifest document(s). The image is filed automatically with the DP form. Once registered, the driver leaves the entry area and walks around the building to the exit area to await the driver's transporter.

Manifest details are entered into the system as a scanned image. This task is carried out before the carrier is X-rayed. Manifest images will be logged with reference to a carrier number to allow the system to match the manifest against the X-ray image generated.

The system associates a DP record with every X-ray image generated. The layout and content of the DP record form can be customized as desired.

Figure 6:
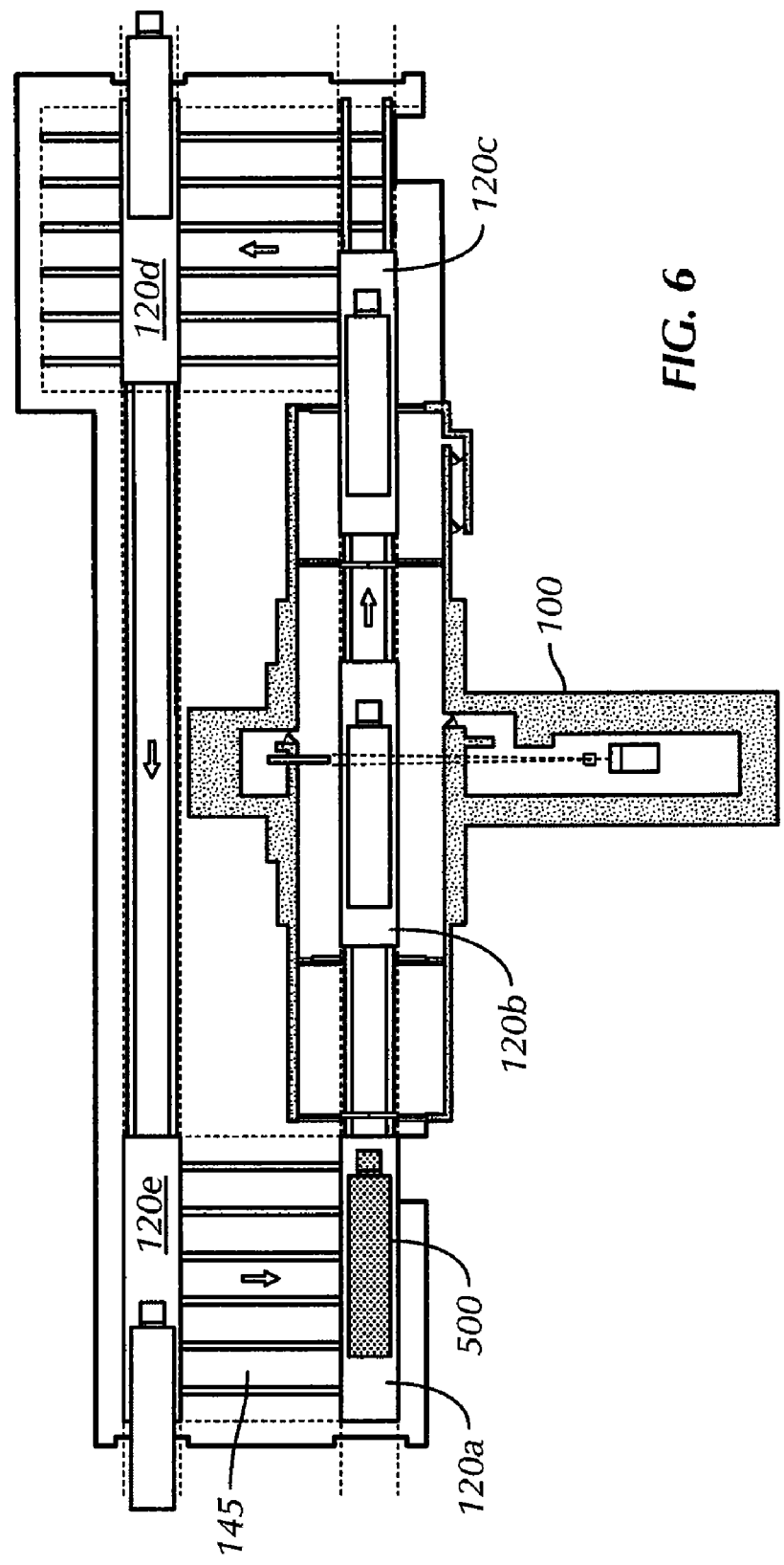

The carrier 120a is then side transferred to the buffer position 145 on the side transfer. If, however, process station 150 is vacant, the carrier 120a travels to that position as shown in FIG. 6. The truck 500 is preferably weighed prior to the side transfer.

The entry door 110 then opens. On confirmation of door 110 being open, the carrier 120a enters the X-ray building 100. Warning klaxons and flashing lights activate as the carrier accelerates to 1 m/s and enters the building via the shield door. Carriers 120b-120e are correspondingly moving around the system S as shown.

The carrier 120a enters and exits the facility via shield doors 110, 112, 114, and 116, which protect personnel from the X-ray source. Hardwire safety interlocks are provided to prevent the source being exposed unless the doors are closed. Carriers are moved through the system by the friction drives, as described above.

When one of doors 110 and 112 is closed and one of doors 114 and 116 is closed and the safety interlocks are engaged, the site control system 210 commands the X-ray system control computer to initiate the generation of X-rays from the LINAC 105. The carrier 120 is then moved at constant speed through the X-ray beam. Having penetrated the cargo, the resultant X-ray beam is detected by the linear detector array 312.

The X-ray beam at the array is converted to a "slice" of electrical signals. The signals are amplified and integrated for a period equivalent to 4 mm of cargo movement. The resultant signals are then digitized and stored in a computer as one "slice" of the X-ray image. Continuous storage of these slices results in an image of the whole carrier being generated with pixel sizes of 4 mm by 4 mm.

The data stored in each pixel is represented by a 16-bit digital word, which provides a range of contrast information that can be manipulated by the processing software to maximize image quality.

Figure 7:
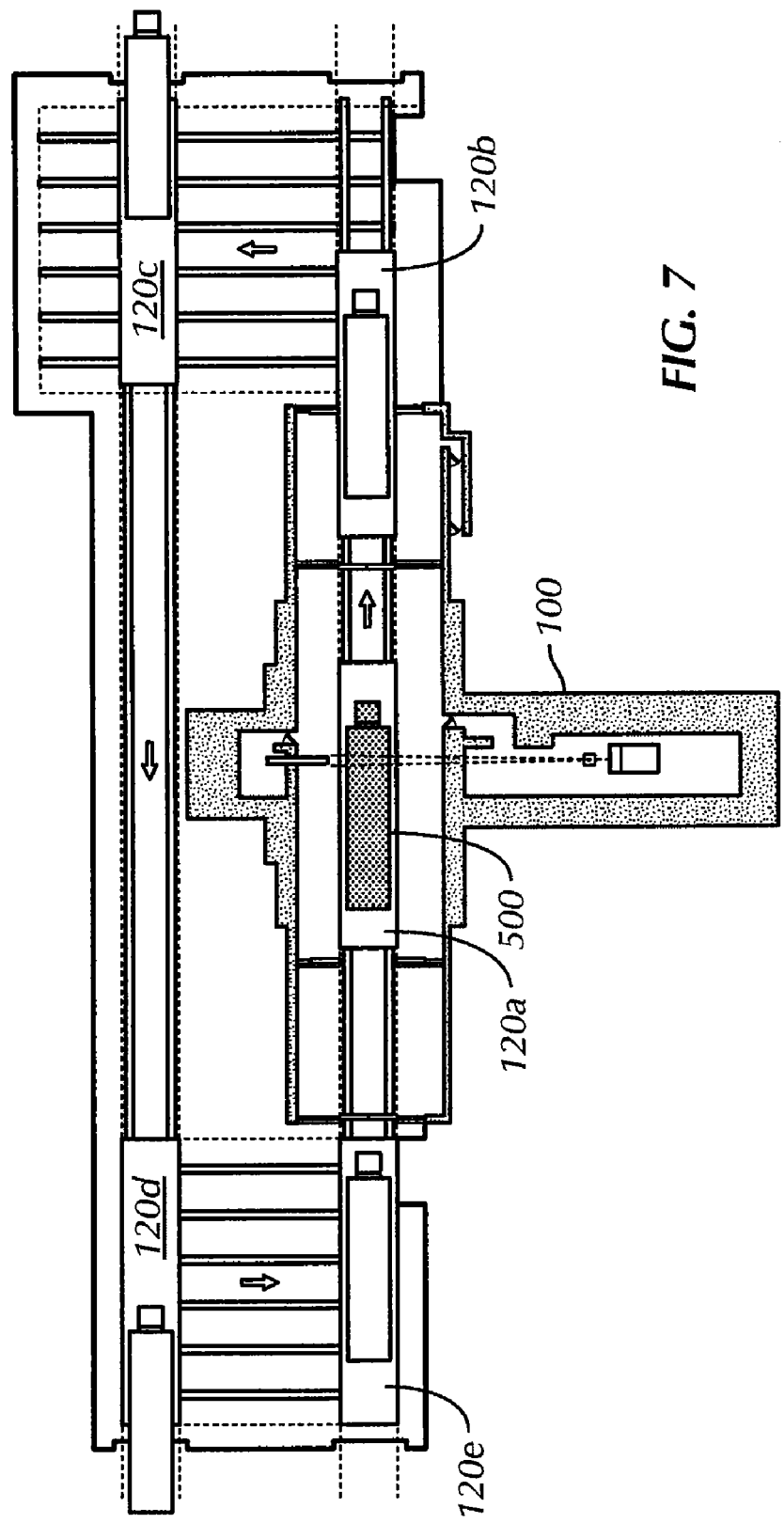

As stated above, in one embodiment, the carrier slows down from 1 m/sec 0.5 m/sec when passing the X-ray as shown in FIG. 7. As the X-ray process takes place, the X-ray control system carries out signal conditioning to correct for environmental tolerances within the array. The system also monitors the LINAC 105 output and carries out a correction for any variation.

Figure 8:
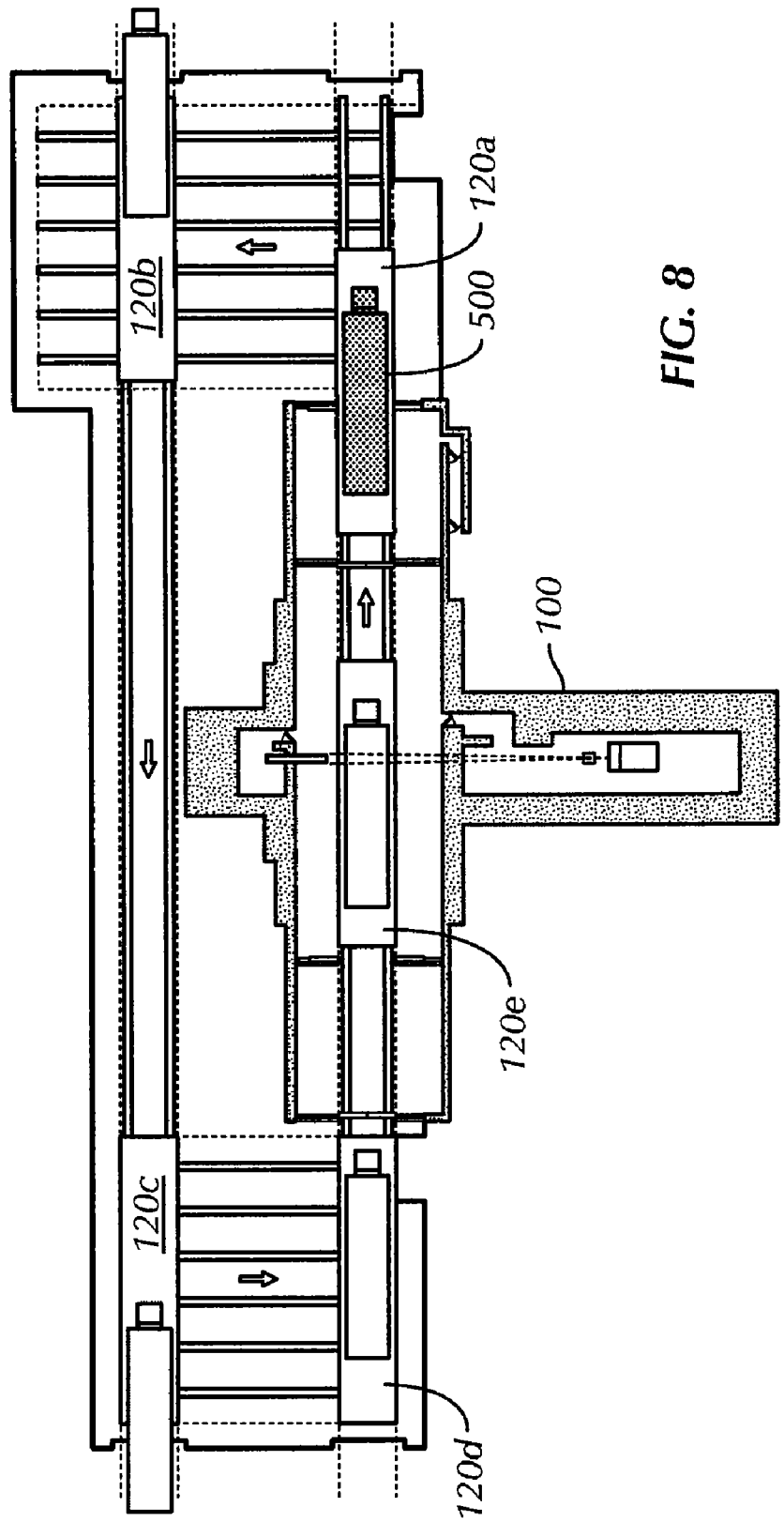

The carrier continues to move past the X-ray. Once the carrier 120a has cleared the X-ray, it is accelerated to a speed of 1 m/sec and exit doors 116 are allowed to open allowing the carrier 120a and truck 500 to exit the tunnel 100 as shown in FIG. 8.

Figure 9:
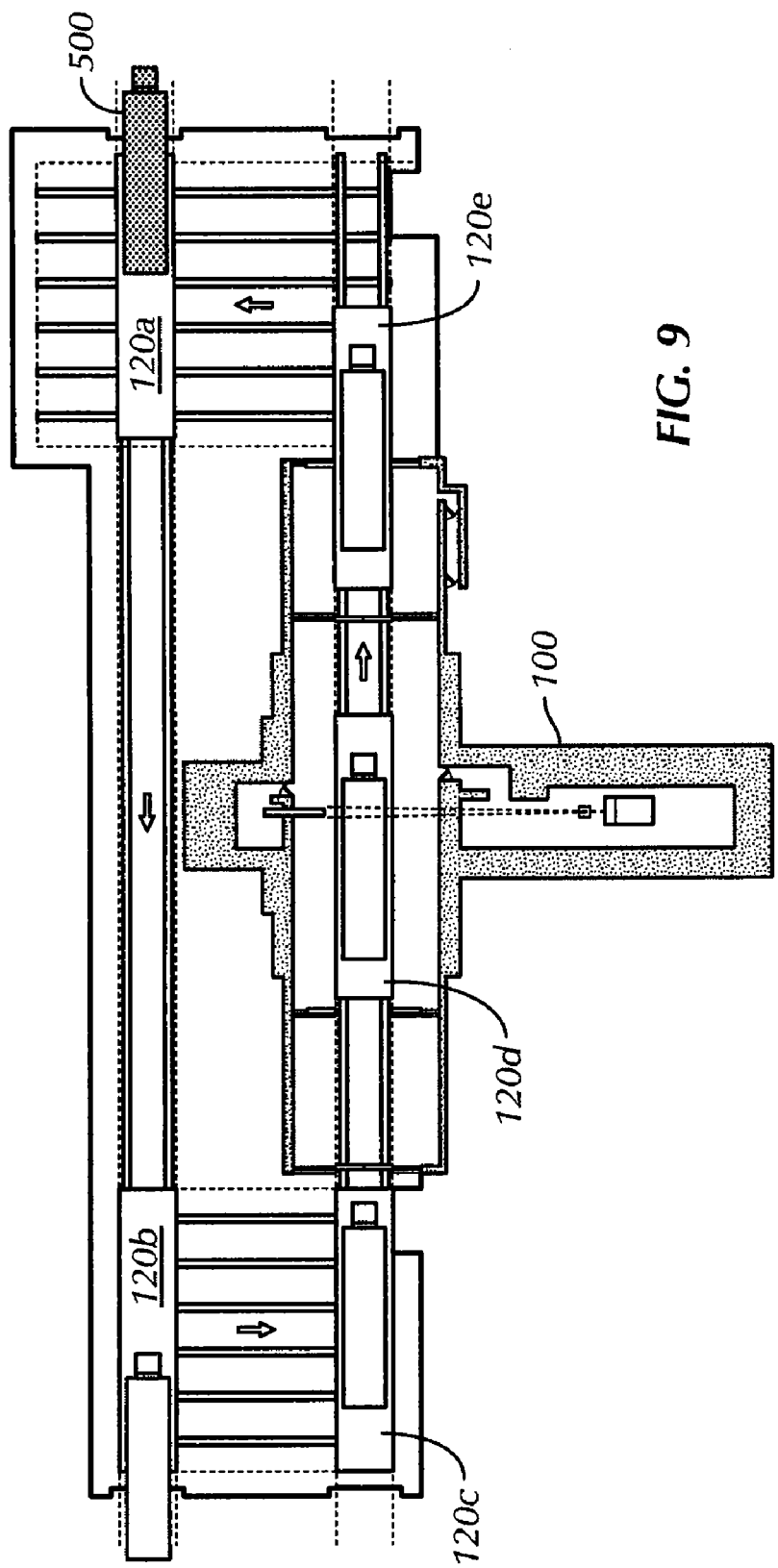

The X-ray screening images are displayed on one of the analyst display stations 235 in the inspector room for assessment. The carrier 120a is then side transferred to the unload station 170. The driver is allowed to remove his truck as shown in FIG. 9, normally in approximately 30 seconds. Once the carrier has come to rest in the exit area, the personnel gate giving access to the exit area by the driver is unlocked. The driver returns to his carrier and the exit barrier is lifted. The carrier may then be driven off and parked in a holding area awaiting a decision on the scan that has taken place. Any suspect container can be checked manually.

As a carrier is moved to the holding area, the scan assessment relating to it is printed out on the exit printer 1052 described below.

The lowerator at the unload station 175 then lowers the carrier 120a and the empty carrier 120a is then driven to the load position 170.

What has been described above is the normal operating mode of the system S. A secondary or manual operating mode can also be provided. In this mode, the system operator is given control of each individual piece of equipment, allowing the operator, for instance, to open and close shield doors, start and stop sub-systems, etc. Manual mode provides a first-line maintenance, inspection, and diagnostic tool to allow detailed control of the system S from a central point. The system, even in manual mode, still implements all internal safety checks to ensure that X-ray alarms are sounded before emission, no attempt is made to emit X-rays with the shield doors open, etc.

Figure 10:
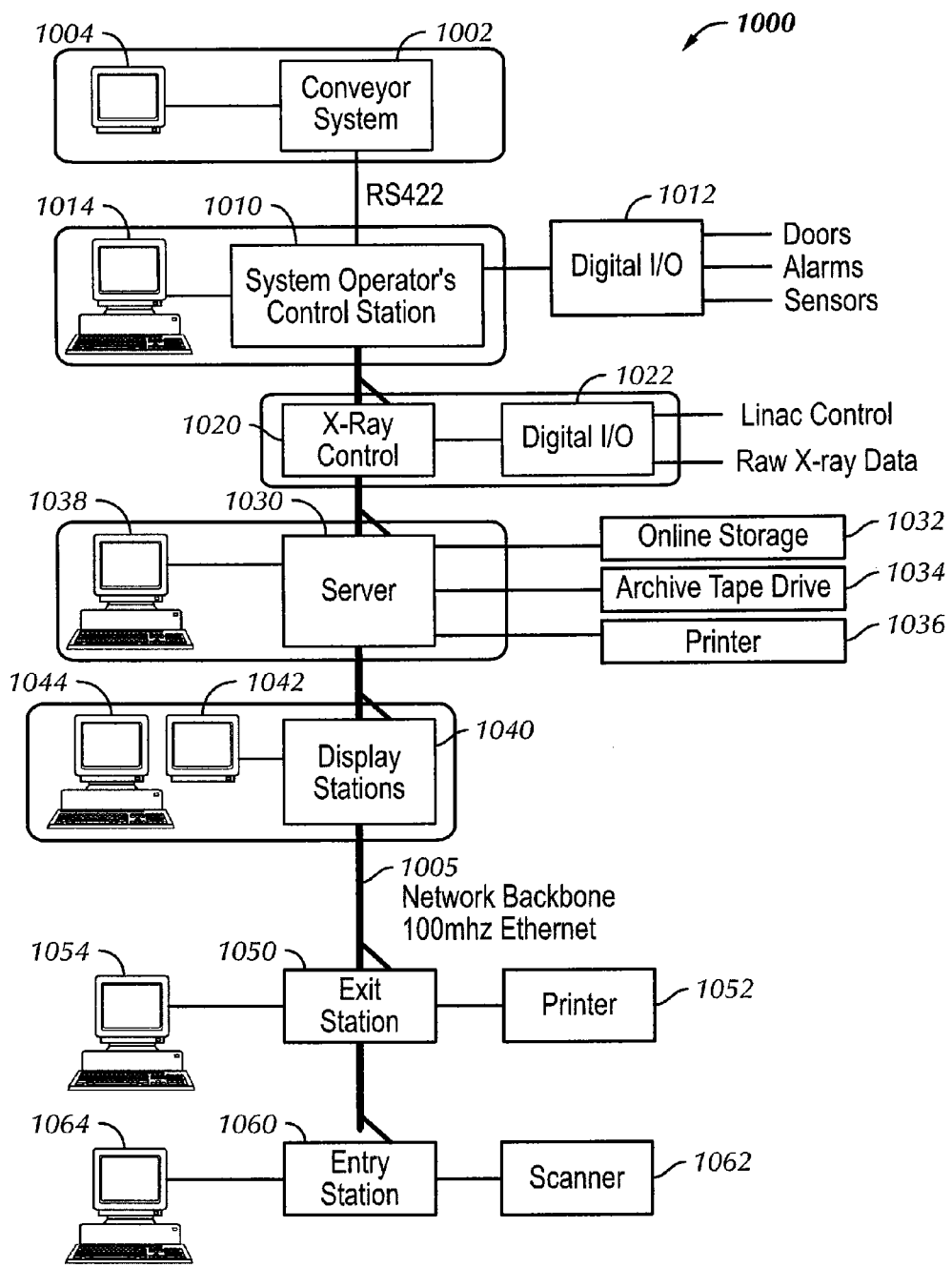
FIG. 10 is a block diagram illustrating a system computer network of one embodiment of a container scanning system.

The site control system 1000 is a distributed processing system that provides overall control of the system, coordinating the operation of the other sub-systems and carrying out all data processing functions. The various systems are linked via an Ethernet network 1005 or other desired networking technology, which is illustrated in FIG. 10. Any desired wiring or networking system can be used to interface sensors and other devices to the operator's control station 1010, including AS-Interface devices and wiring. The majority of the systems on the network can use standard commercially available hardware.

In one embodiment, communication and control of the site control system 1010 and the associated devices adhere to the Actuator Sensor-Interface (AS-I) standard. The specification of the AS-I standard is described in Werner R. Kriesel & Otto W. Madelung, *AS-I Interface The Actuator-Sensor-Interface* for Automation (2nd ed. 1999) and discussed in the following patents (all of which are hereby incorporated by reference in their entirety for all purposes): U.S. Pat. No. 6,294,889 for a Process and a Control Device for a Motor Output Suitable for being Controlled through a Communication Bus, U.S. Pat. No. 6,378,574 for a Rotary Type Continuous Filling Apparatus, U.S. Pat. No. 6,332,327 for a Distributed Intelligence Control for Commercial Refrigeration, U.S. Pat. No. 6,127, 748 for an Installation for Making Electrical Connection Between an Equipment Assembly and a Command and Control System, U.S. Pat. No. 6,173,731 for an Electrofluidic Modular System, U.S. Pat. No. 6,222,441 for a Process and Circuit for Connecting an Actuator to a Line, U.S. Pat. No. 5,978,193 for a Switchgear Unit Capable of Communication and U.S. Pat. No. 5,955,859 for an Interface Module Between a Field Bus and Electrical Equipment Controlling and Protecting an Electric Motor.

The operator's control station 1010, corresponding to station 212 of FIG. 2, is used to display the status of the inspection system. A mimic display 1004 is used to show the position of each carrier as it passes through the X-ray scanner. The doors 110, 112, 114, and 116 are shown as open, closed, opening or closing. Other information such as the status of the image analysis stations 1040 is also displayed on screen 1014. An error message from any of the subsystems will result in the icon representing that subsystem changing color to indicate either a potential problem or one that has stopped the system. Digital I/O circuits 1012 connect the control station 1010 to doors, alarms, and other sensors.

The operator's control station 1010 is also used to drive the system when in maintenance or manual mode. In this state, each stage of the scanning cycle can be started manually by selecting the appropriate icon on the display. This mode can be used during commissioning or when carrying out repairs to the system. Under certain fault conditions, it also allows continued operation of the system while waiting for a repair to be carried out. The control station 1010 is also connected by network 1005 to the XCS 1020, which uses digital I/O interface 1022 to connect to the LINAC 105 and LAS 108, receiving raw X-ray data as desired.

Six analysis stations 1040, corresponding to stations 235 of FIG. 2, are provided to monitor traffic through the system S. Each image analysis station 1040 consists of a high-performance image processing workstation, equipped with standalone graphics workstations and two color monitors 1042 and 1044. Monitor 1042 displays the X-ray image and the monitor 1044 displays the manifest data and Data Processing form. This provides a graphical user interface where all commands can be entered by using icons.

All operations on the image screens 1042 and 1044 can be controlled using a mouse. Images are scrolled using slider bars. Areas of interest can be selected by clicking and dragging the mouse. Image processing functions, including zooming, can be invoked by clicking on icons. The mouse cursor will only appear on one screen at a time. As it moves out of the right side of the one screen, it will appear on the left of the other.

The analysis station 1040 contains sufficient disc space to hold copies of at least two images: the one currently being viewed and the next in line. This means that when the analyst has finished viewing one the analyst can immediately start looking at the next without waiting for it to be passed from the server.

By default, the analyst is provided with an image already enhanced by an image-processing algorithm specifically developed for optimizing the images obtained from the container. The analyst can then conduct a search procedure that shows every part of the image enhanced in this way, giving the analyst opportunity to spot any anomalies in the shortest possible time. The analyst may stop this procedure at any desired time, apply further enhancements, or print out a color copy of the enhanced image.

A wide range of enhancements can be provided together with the flexibility to apply the enhancements in multiple ways. Enhancements may be applied to the complete viewing area or just a portion of it and enhancements may be nested in any order. The analyst can also be provided with an "undo" facility to go back a step if an enhancement does not have the desired effect.

While viewing an image, or having viewed the entire image, the analyst enters an assessment. This is typically made up of two parts: a required recommendation and an optional justification. The recommendation can be one of clear, search (suspicious object or misrepresentation identified), or caution (uncertain, may need to search). If the "caution" recommendation is entered, then the analyst can enter one or more of the following justifications: cargo too dense, cargo too complex, or anomaly identified.

These assessments can be entered using an icon-based system. These assessments and justifications are exemplary and illustrative only and other assessments and justifications can be used.

A central server 1030 holds any image data that is waiting to be analyzed. This computer is also used to store the images in online storage 1032 from at least the last 600 or other desired number of carriers that have been scanned. In addition, image files can be stored on permanent media, such as archive tape drive 1034, for long term archiving.

Once an assessment has been entered, the analyst "closes" the viewed image. This deletes the copy of the image held in the display station 1040 but not affect the "master" copy held by the system server 1030. The "master" copy remains available for archiving or for other analysts to view, together with the DP record, including the assessment, and the manifest associated with that image.

Some text may need to be input to accompany the image file. This includes the customs inspector's identification, the result of the analysis and any comments. This data can be input onto the screen 1044 containing the manifest image using a conventional keyboard.

Data processing functions such as the routing and storage of manifest data, carrier details, inspection results, etc. are carried out by the system control 1010, analyst display stations 1040 or any of the terminals connected to the system such as exit station 1050 and entrance station 1060. When the driver provides the manifest for the container to be inspected to personnel at the entrance station, the manifest can be scanned by the scanner 1062, checked on display 1064, then sent to the appropriate analyst workstation 1040, where the analyst can see the manifest on screen 1044 to compare with the digitized X-ray image on screen 1042.

The exit station 1050 allows exit personnel to view inspection results on screen 1054 and print any desired papers on printer 1052 for delivery to the driver or for any other desired purpose. This provides a computerized "forms management" system, which ensures that manifest data, X-ray images and inspection results are kept together.

The site control system 210 controls building entry and exit X-ray shield doors. Door interlocks and alarms are provided to ensure a high level of safety, with the system controller 1010 monitoring all relevant equipment as part of its sequence control function. Current sensing circuitry can be included in all alarms to further enhance the safe operation of the equipment. In addition, public address and CCTV facilities can be provided for the system operator's use.

The following safety features can be built into the building and equipment in a typical embodiment. All equipment, buildings, spares and procedures are designed, constructed, implemented and operated so as to materially comply with all relevant national legislation on safety issues. No personnel will be allowed in any hazardous area during X-ray processing, i.e., scanning chamber 101, Linear Array System (LAS) room 108 and the X-ray Room 106 housing the LINAC 105.

The sliding shield doors 110, 112, 114, and 116 have a safety feature intended to prevent objects from being crushed. Detection of an obstruction will stop the doors and, in turn, the conveyor system will be brought to a safe condition. A maintenance activity will then be required to reset and allow the cycle to continue.

Doors-closed switches are provided to inhibit X-ray generation when the appropriate shield doors 110, 112, 114, or 116 or any of the personnel access doors are not fully closed. A fully integrated safety interlock system can be supplied.

A controlled access key system can be provided to allow safe entry to the facility and also allow a search and seal activity when leaving the X-ray Room 106 and X-ray scanning chamber 101 after maintenance activity. This access system can utilize a system of interlock doors, door locks, and key switches.

Fire detectors can be fitted to all areas. Fire alarms should preferably be audible and comply with local regulations. Extinguishing facilities, preferably non-automatic, suitable for electrical and combustible material fires can be provided in accordance with local regulations.

Audible and visual alarms are provided that operate whenever there is movement by the conveyor system or the shield doors 110, 112, 114, and 116.

The energizing of alarms in operational and maintenance mode can be for the duration of any conveyor system movement or shield door operation and controlled by the site control system unit (SCS) 210.

To provide audible and visual indications of potentially hazardous conditions, the SCS 210 can initiate a minimum of 3 internal audible/visual alarm units. Other numbers and types of alarms can be used.

In addition, in one embodiment, there are three external visual alarms: one situated at the entrance and exit, and one adjacent to the X-ray scanning chamber 101.

Emergency stops are provided to enable power to be isolated manually. When initiated they require a mechanical reset function before normal operation can be resumed. Emergency stops positions and instructions are clearly marked.

Emergency stop buttons can be situated at frequent intervals in the X-ray scanning chamber 101, close to maintenance control points, at the X-ray supervisor's console 1020, adjacent to the LINAC control rack, in the X-ray Room 106, in the LAS room 108, in the entry reception area between doors 110 and 112, and in the exit area between doors 114 and 116.

In addition, a pull-wire emergency stop system can be supplied along the entire length of the X-ray tunnel 100. Other emergency stop systems and locations can be used.

Six closed circuit TV cameras are provided in one embodiment. One camera is positioned at each end of the scanning chamber 101 looking along the tunnel 100. The other cameras can be externally mounted at the entry and exit areas, and can be directed to view the loading and unloading positions 170 and 175.

Six CCTV monitors can be supplied according to one embodiment. These can be connected one to each of the CCTV cameras or in any other desired way, and will form part of the System Operator's station 1010, to indicate the logical sequence of cargo movement through the facility. Other numbers, arrangement, and placement of CCTV cameras and monitors can be used.

Two communications systems can be supplied. The main X-ray facility can have a public address (PA) system covering the carrier entry and exit areas. A jack-socket intercom system can also be provided in the several areas of the system S, to enable communications between personnel during maintenance activities. Typical intercom locations are in the scanning chamber 101, the X-ray room 106, the LAS room 108, maintenance positions (entry and exit), in the operations/display areas, in the LINAC Control Area (typically located within an electrical services room), in an entry reception room, in an exit room, and in the electrical services room.

To maintain site safety, radiation-monitoring equipment is provided to allow regular site surveys for radiation leakage. The system design incorporates fences, barriers, audio/visual warnings, and operational control procedures to reduce the risk of injury to operational personnel and to drivers of carriers. Both entry and exit areas can be surrounded by fencing of a height sufficient to prevent casual entry. Carrier movement is controlled using pivoting or other movable barriers with warning lights for low visibility operation. Personnel can gain access to controlled areas via secure turnstiles that can require them to have been operated before the control system initiates the next operation in the handling of the containers.

Notices can be displayed in operation and maintenance areas to warn personnel of certain potentially hazardous equipment. These notices should comply with local, national, and international standards as required. Radiation symbols can be painted on the main entry and exit shield doors.

Nominally, in a disclosed embodiment as described above, the display resolution, as determined by the array geometry, is 4 mm. However, because of the wide dynamic range of the detection and imaging system and because incoming signals to the LAS are integrated over a short period of time, objects significantly smaller than 4 mm can be imaged successfully.

At a scan rate of 0.5 meter/sec as described above, the inspection systems is capable of imaging a step as small as 0.5 mm in 100 mm of steel and a step as small as 9 mm in 300 mm of steel. It is also capable of imaging wires of 2 mm diameter behind 100 mm of steel and wires of 9 mm diameter behind 300 mm. Other embodiments can have other resolution capabilities.

Figure 11:
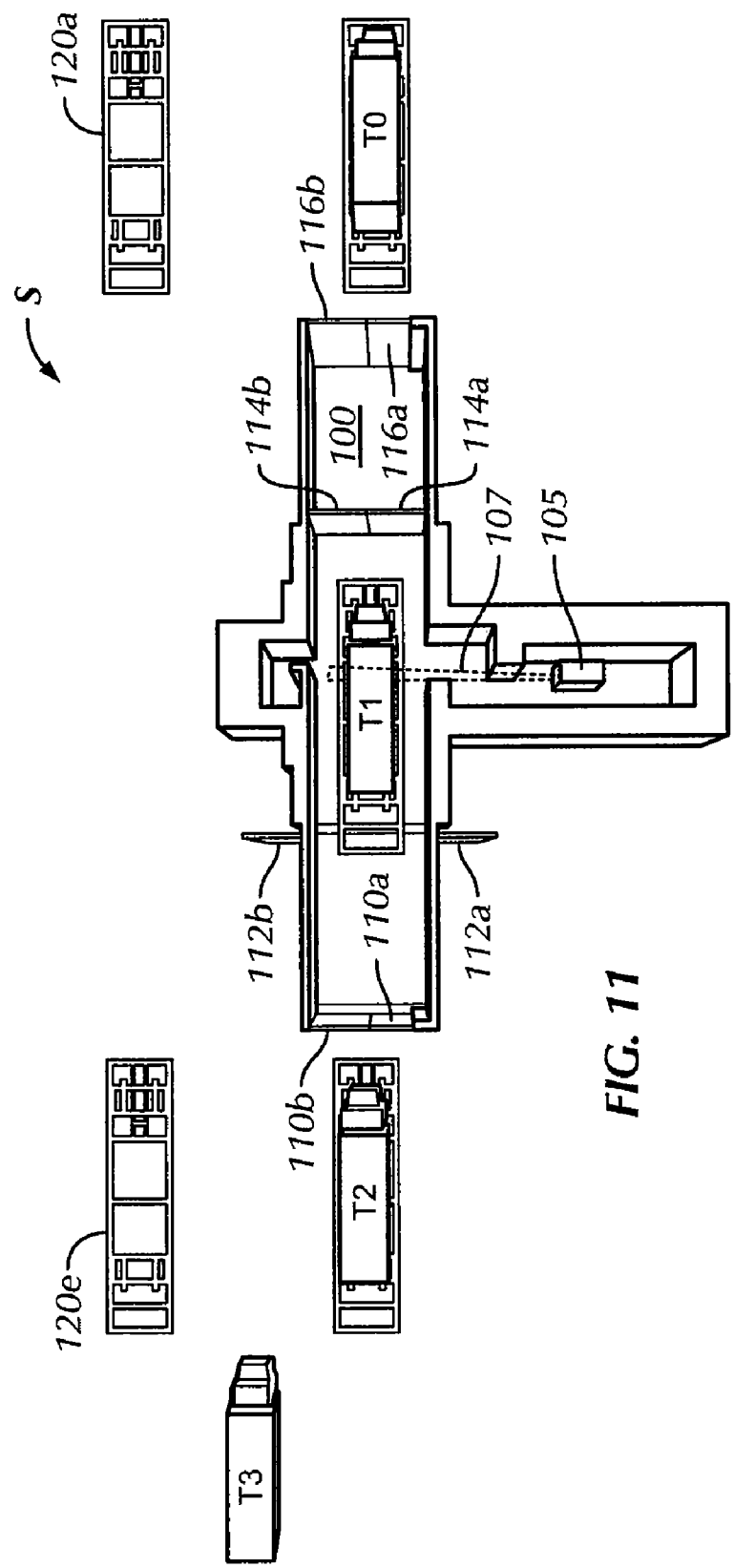
FIGS. 11-22 are plan views illustrating use of the scanning system of FIG. 1.

FIGS. 11-22 are plan views of an inspection system according to one embodiment, showing movement of several trucks T0-T5 through the system S, illustrating movement of two carriers through the tunnel at various times. In FIG. 11, truck T0 has exited the tunnel 100 after inspection. Carriers 120a and 120e are now empty, ready to be recirculated. Meanwhile, because door leaves 110a and 110b abut each other when closing door 110, and door leaves 114a-114b abut each other when closing door 114, truck T1 can be scanned by the X-ray generator 105, even though interior door 112 is open with leaves 112a-112b separated. Truck T2 is waiting at process station 150, while truck T3 is ready to load onto a carrier 120. In the embodiment of FIGS. 11-22, load station 170 and unload station 175 are in the transverse rail 145 and 140 areas, rather than at the junction of rails 135, 140, and 145 as shown in FIG. 1.

Figure 12:
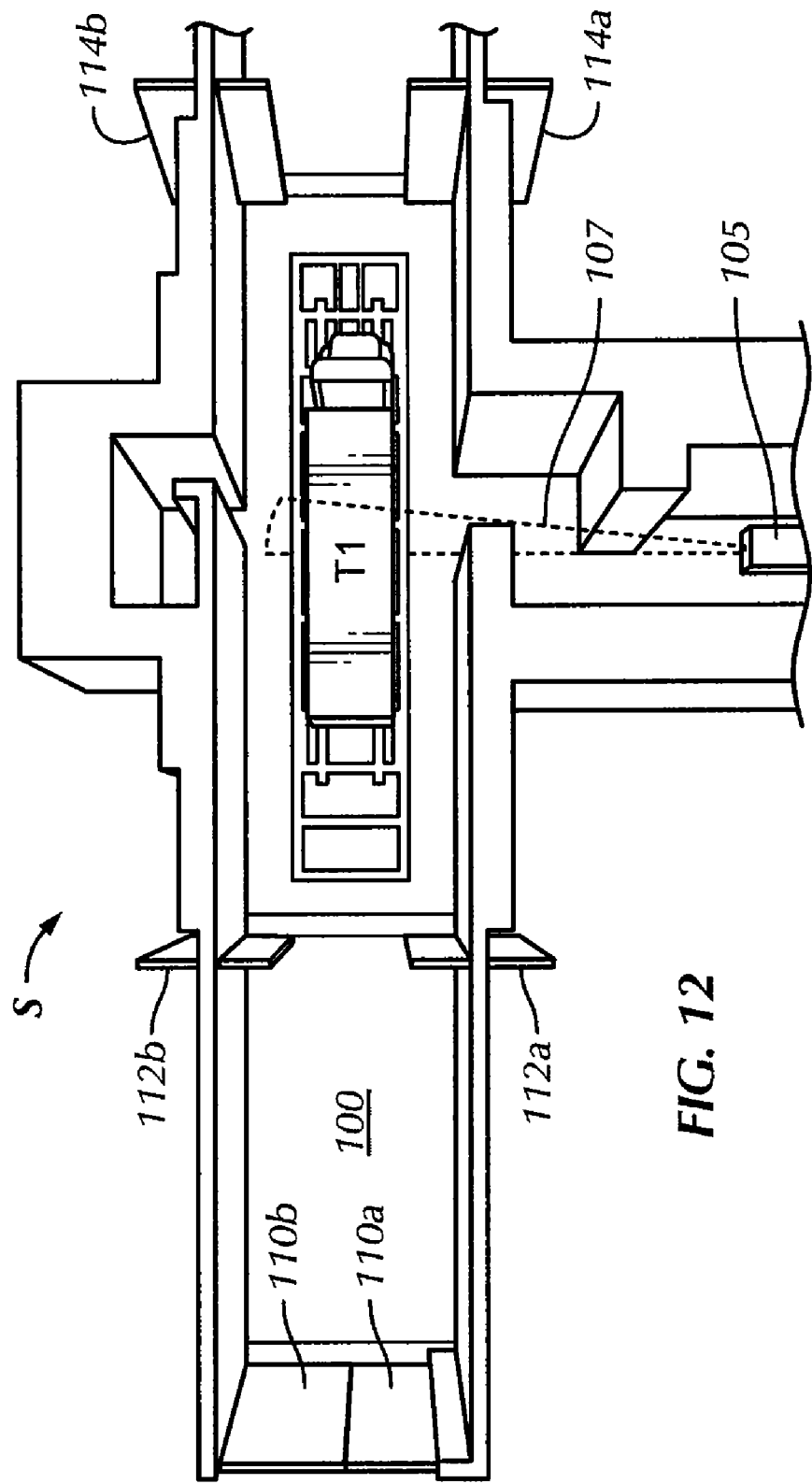
Figure 13:
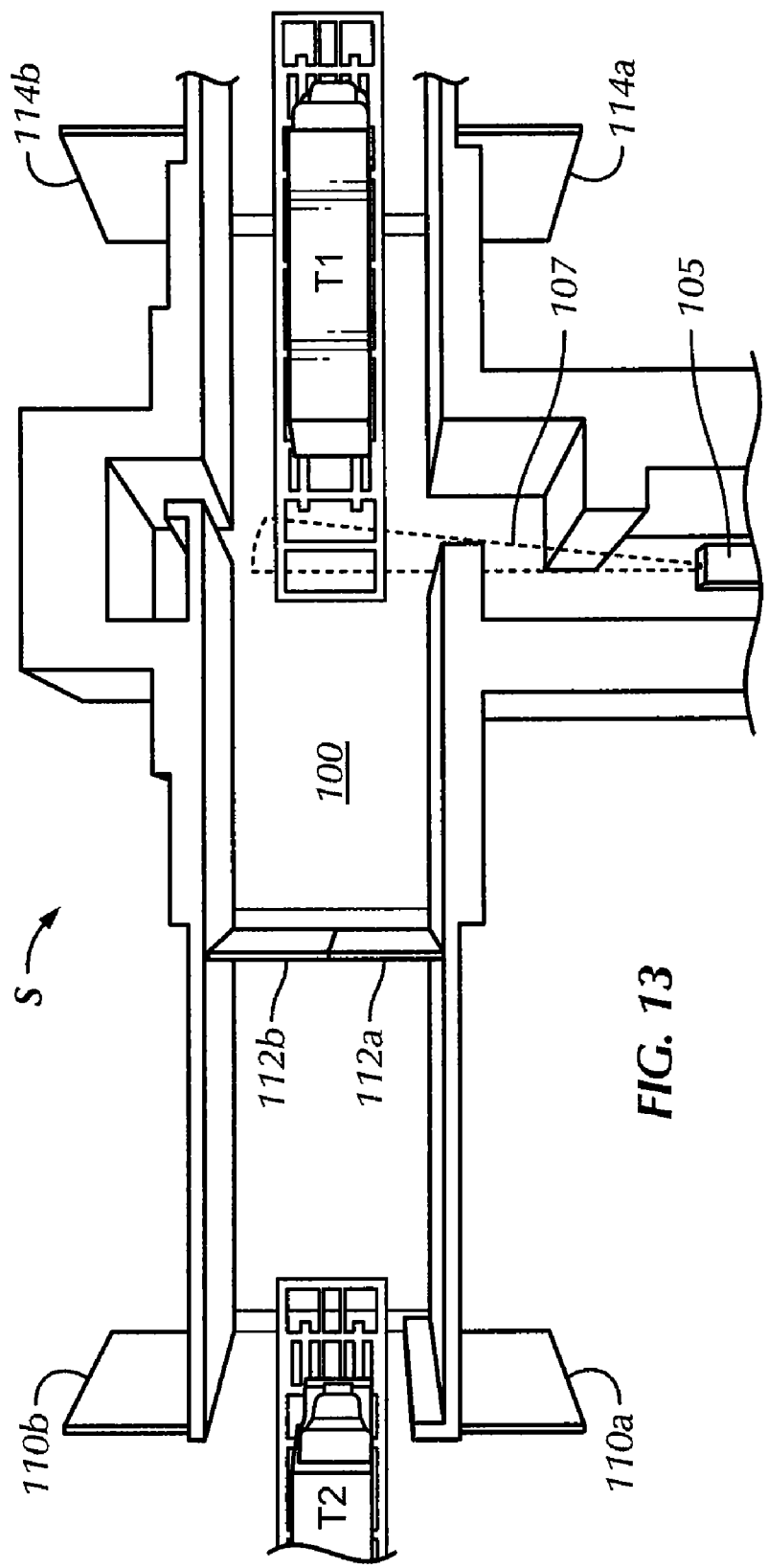

Turning to FIG. 12, truck T1 has continued through the beam 107, interior entrance door 112 is closing and interior exit door 114 is opening, while door 110 (and door 116, not shown) remain closed. FIG. 13 shows truck T1 beginning to move through door 114 with door 112 now fully closed, allowing truck T2 to begin entering through open door 110, even though truck T1 is still being irradiated by X-ray beam 107.

Figure 14:
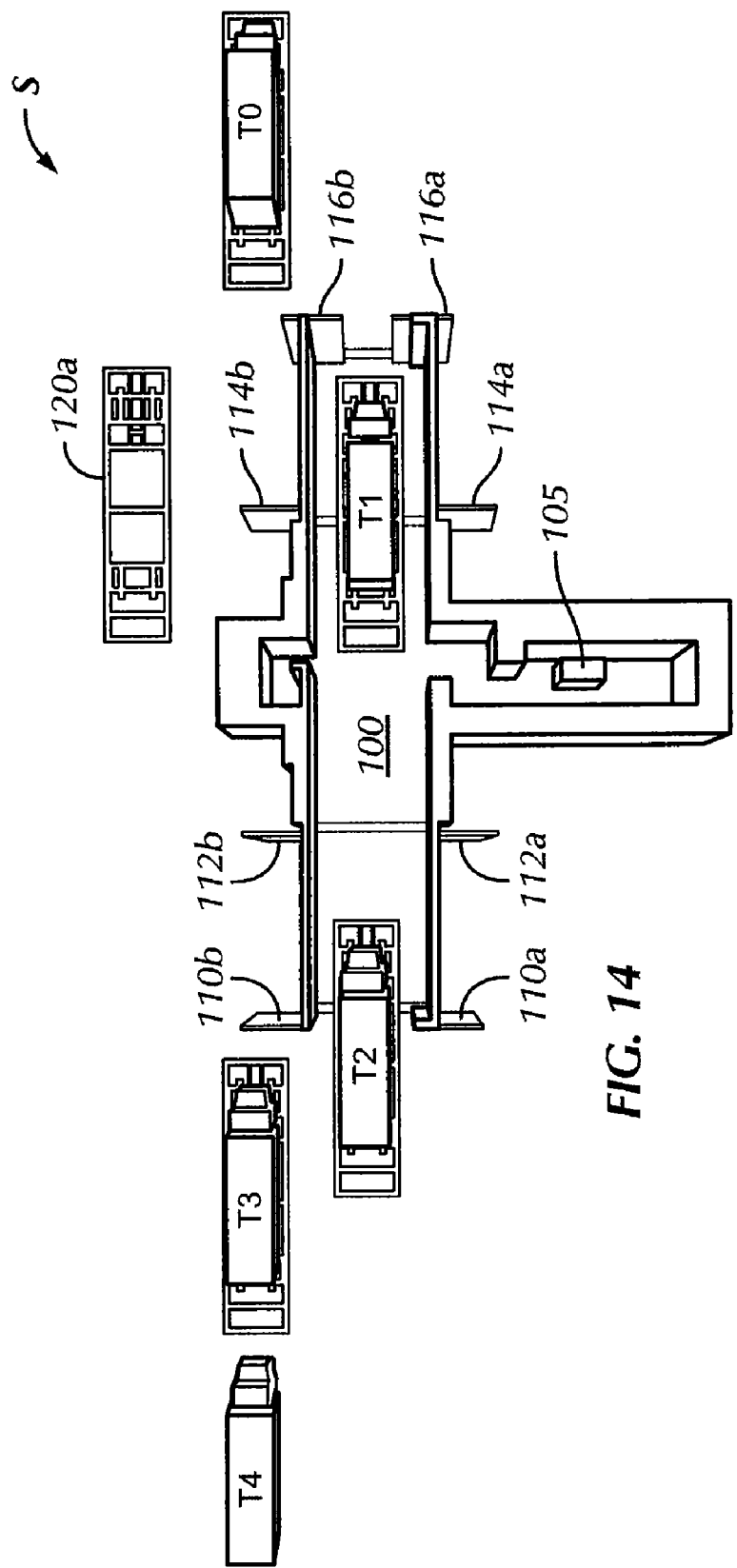
Figure 15:
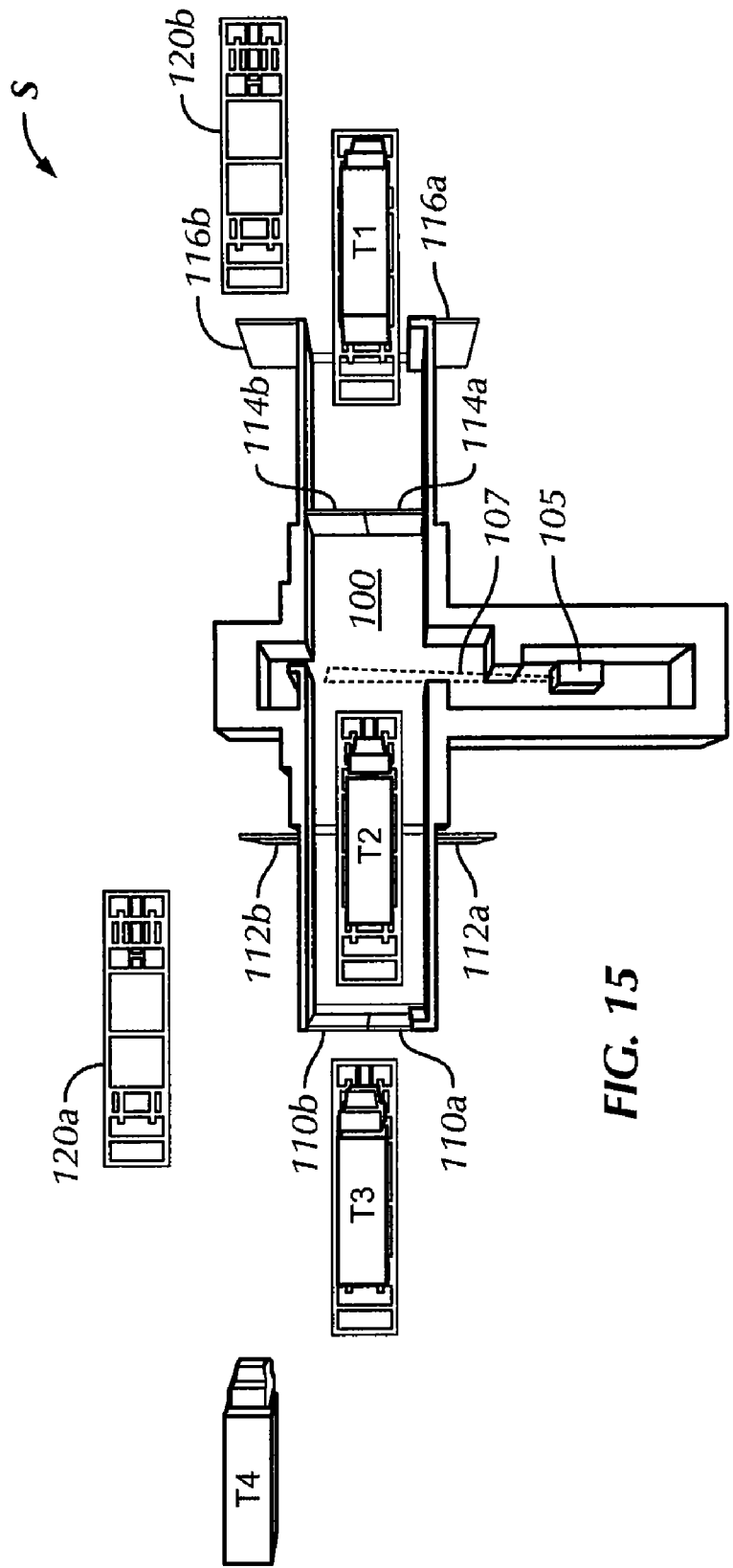
Figure 16:
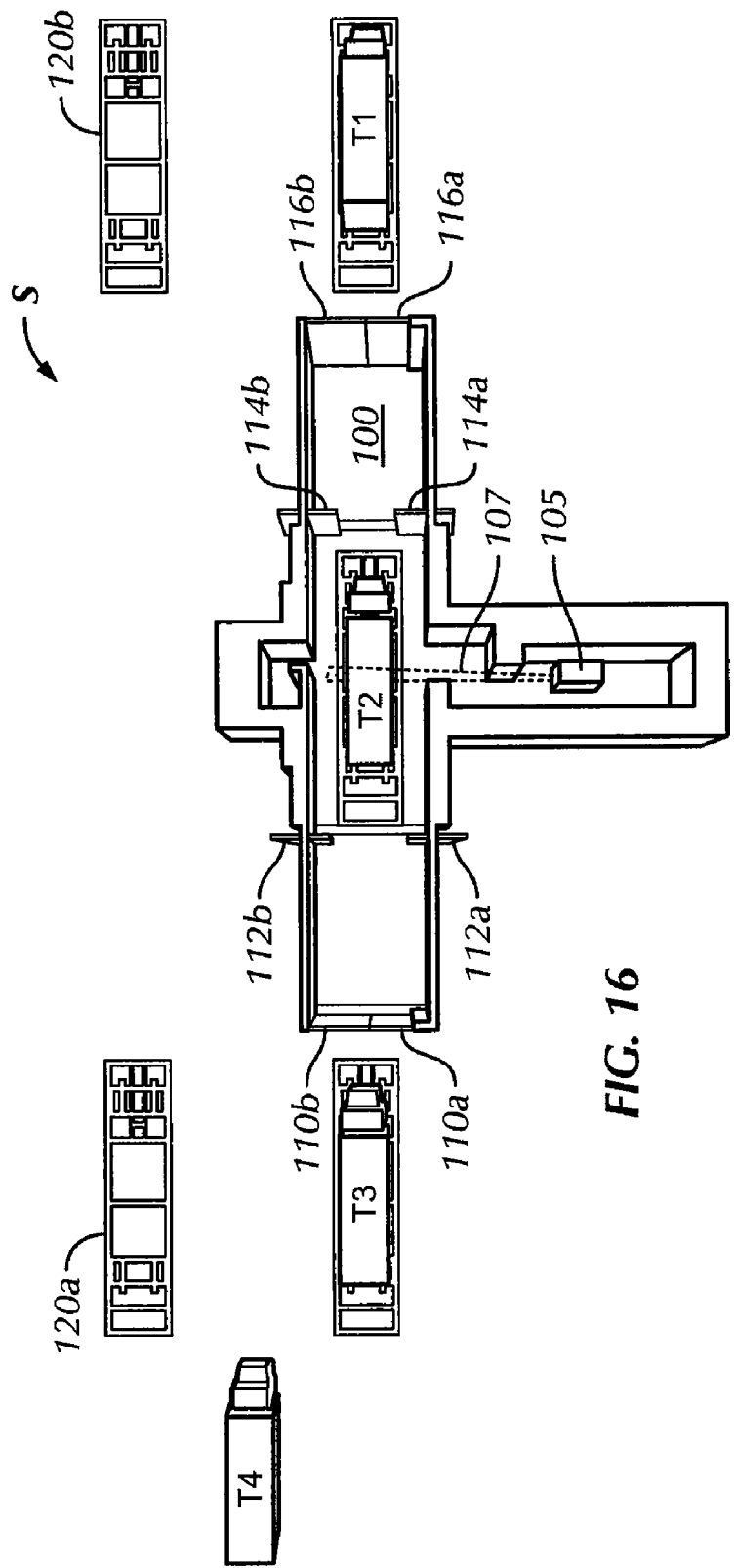

In FIG. 14, truck T1 approaches opening door 116, while truck T2 continues to enter tunnel 100. At this point, all four doors 110, 112, 114, and 116 are at least partially open. Truck T0 has moved transversely to unload station 175, while truck T3 has loaded at load station 170 onto carrier 120e. Truck T4 awaits loading, while carrier 120a is moving along track 135 (not shown) back to the entrance end of tunnel 100.

Figure 18:
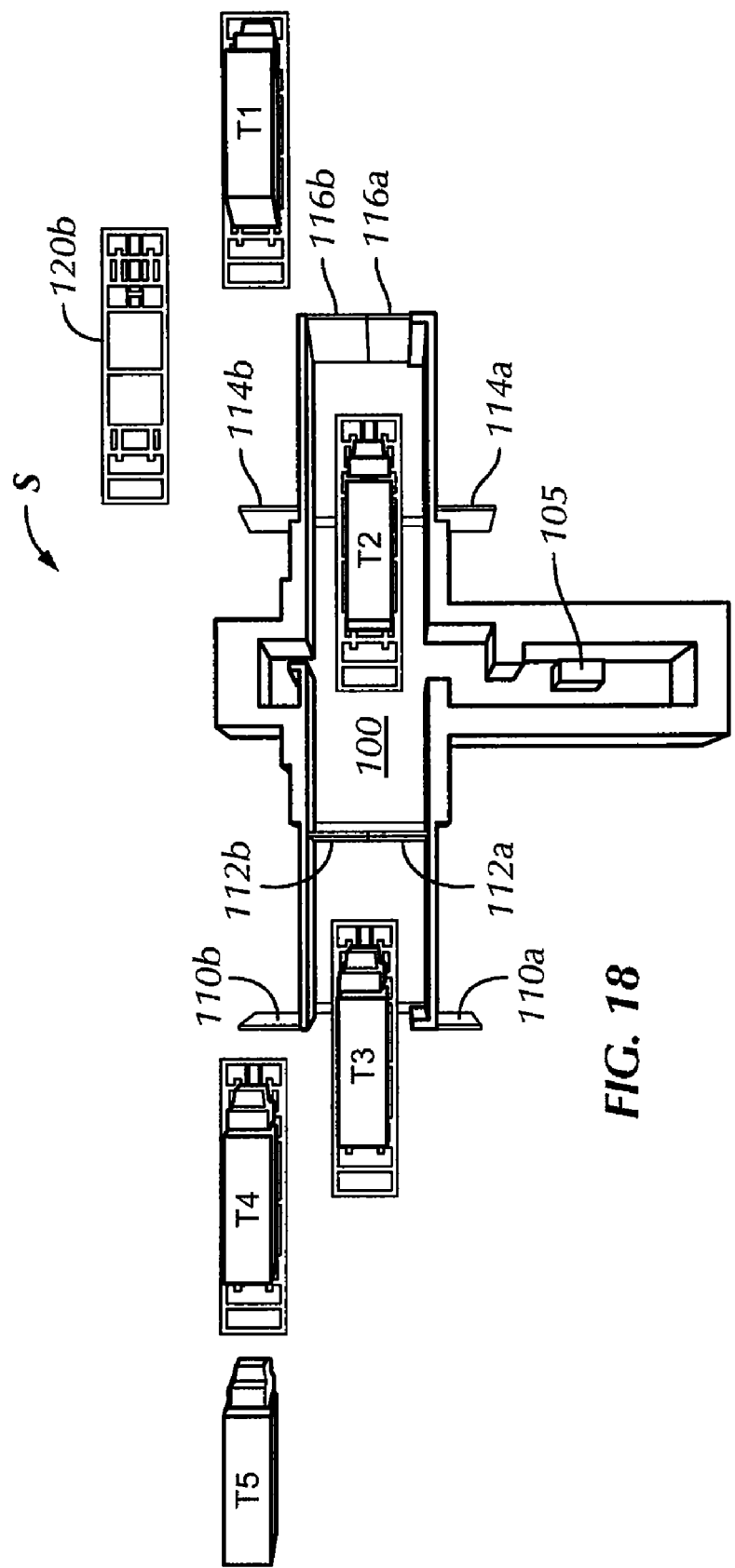
Figure 19:
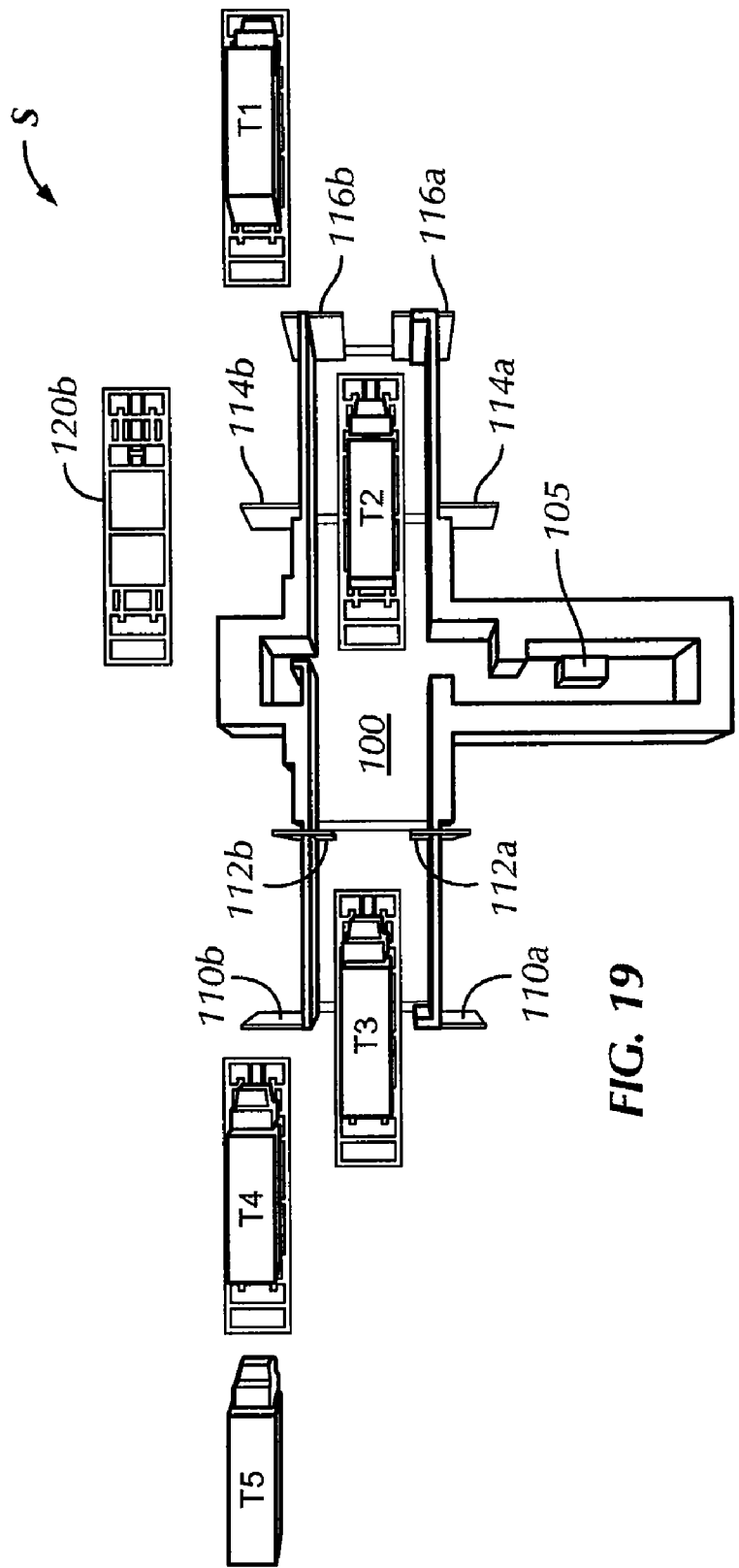

Turning to FIG. 18, door 114 has closed, while truck T1 is still exiting tunnel 100. This allows scanning of truck T2 by beam 107, because door 110 is also closed. Truck T0 has been unloaded from carrier 120b, which can then recirculate. Continuing with FIG. 16, truck T2 is being scanned as door 114 is opening, while doors 110 and 116 are closed and door 112 is closing. Carrier 120a is now ready to move to load station 170.

Figure 17:
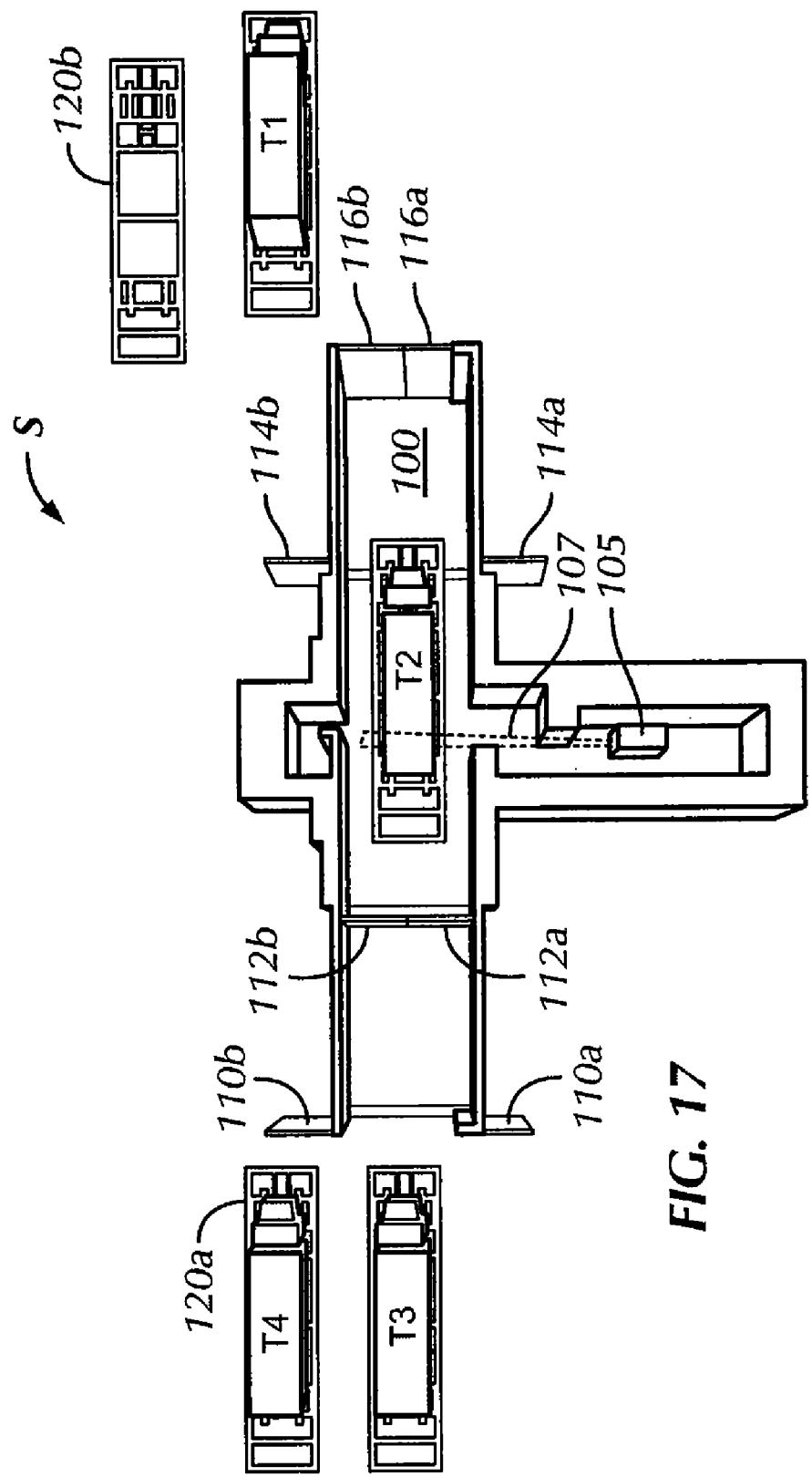

In FIG. 17, truck T4 has loaded onto carrier 120a and truck T3 is waiting for door 110 to fully open before entering tunnel 100, even though truck T2 is still being scanned. T2 moves through open door 114 towards closed door 116. Continuing to FIG. 18, the X-ray generator is off, even though doors 112 and 116 are fully closed, because truck T2 has now passed the plane of X-ray beam 107 (not shown). Truck T3 has begun to enter tunnel 100. Carrier 120b is recirculating. Then in FIG. 19, door 116 begins to open when truck T2 approaches the door 116, as shown by separated door leaves 116a and 116b. Truck T2 has not stopped moving while inside tunnel 100, because the conveyor system and site control system control the movement of doors and carriers together. Likewise, truck T3 continues forward to nearly fully open door 112 without having to wait for truck T2 to exit tunnel 100. Truck T5 has arrived and waits to be loaded onto a carrier 120, while truck T4 waits in buffer station 165 for truck T3 to leave process station 150.

Figure 20:
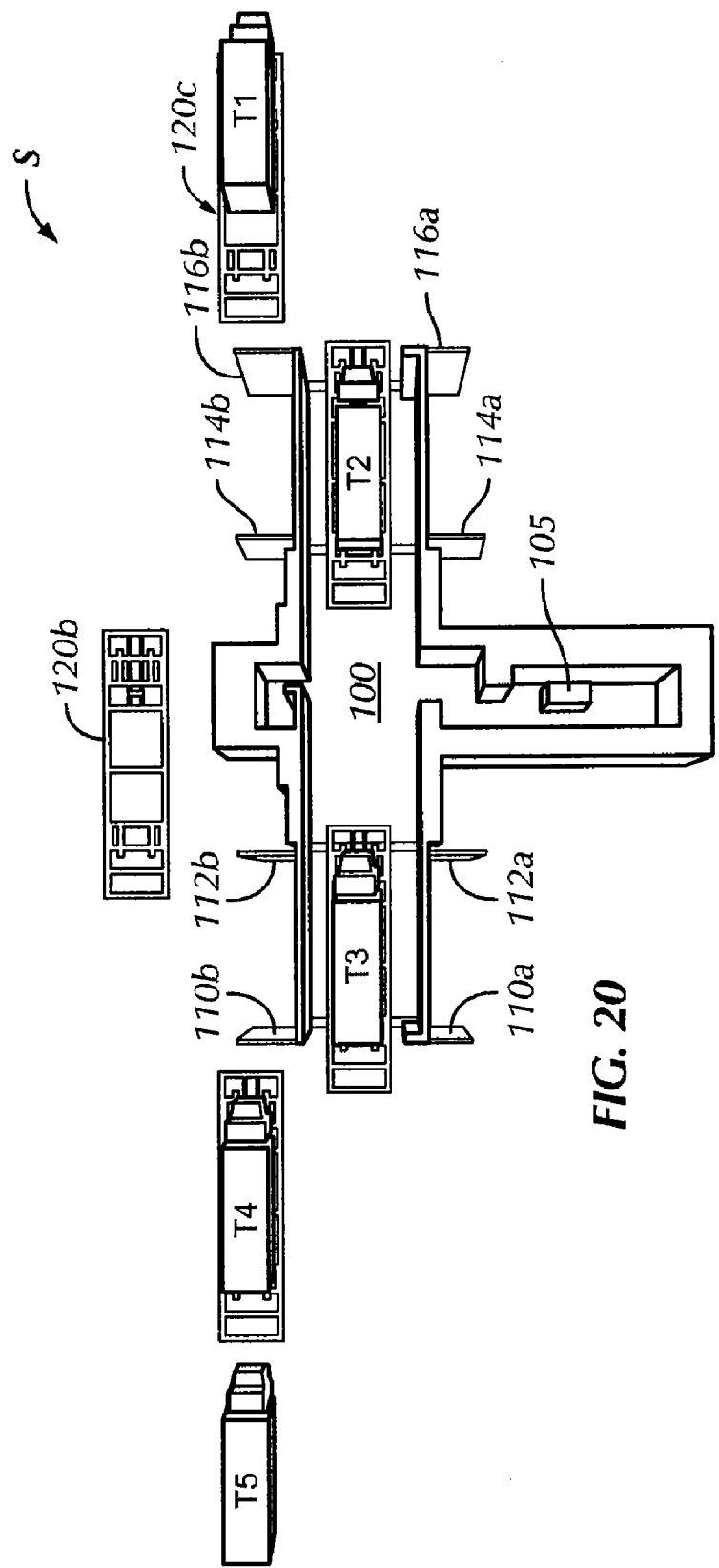

In FIG. 20, all four doors 110, 112, 114, and 116 are fully open, as trucks T3 and T4 continue moving through tunnel 100. Doors 112 and 114 are positioned within tunnel 100 far enough apart to accommodate the longest container to be scanned between them, plus clearances on either end. The length of tunnel 100 is also determined by the maximum desired container length, so that there is clearance between door 110 and the maximum length container, and simultaneously between the container and the beam 107. Likewise, the tunnel 100 provides clearances for the maximum length container between beam 107 and door 116. Note in FIG. 20, truck T1 is being driven off carrier 120c.

Figure 21:
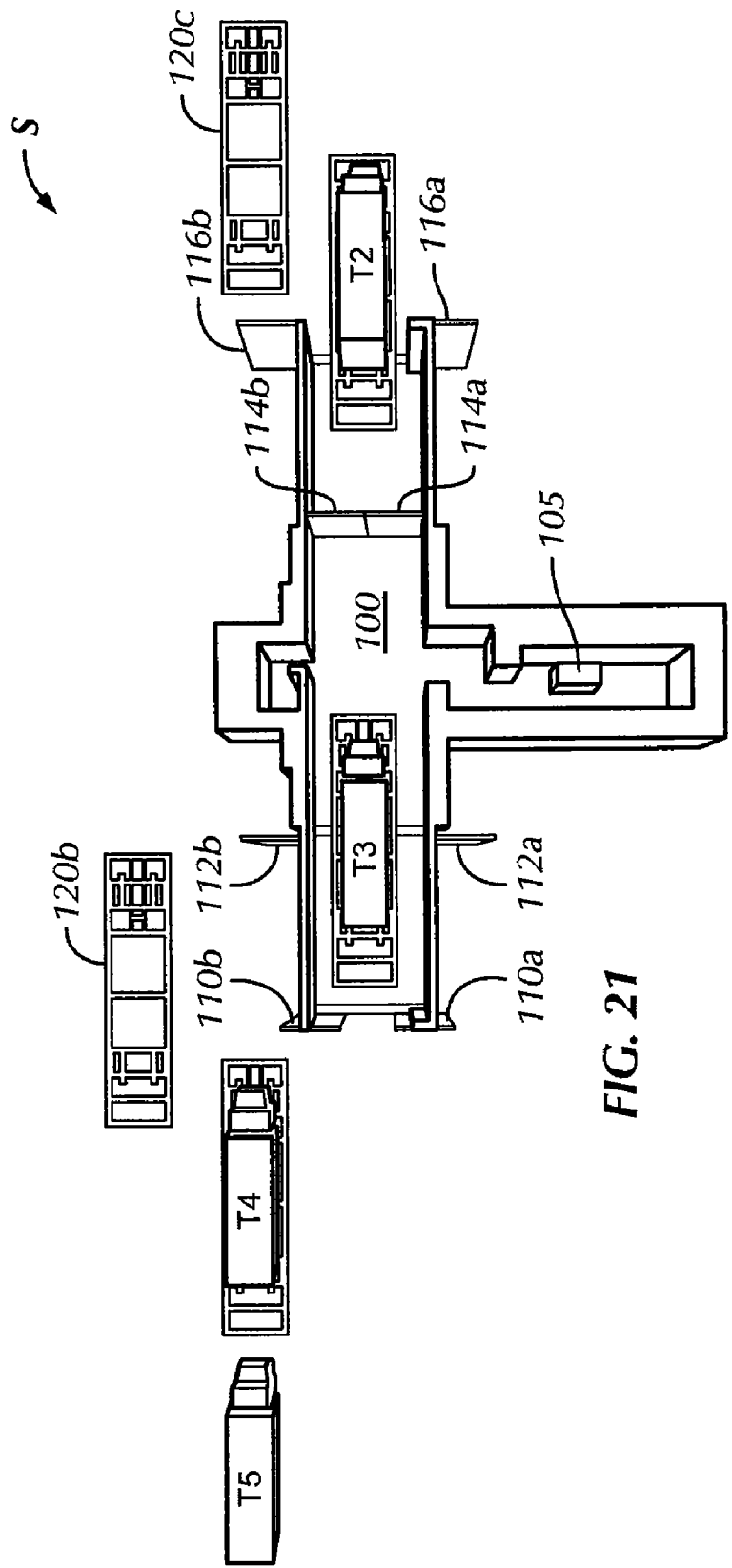
Figure 22:
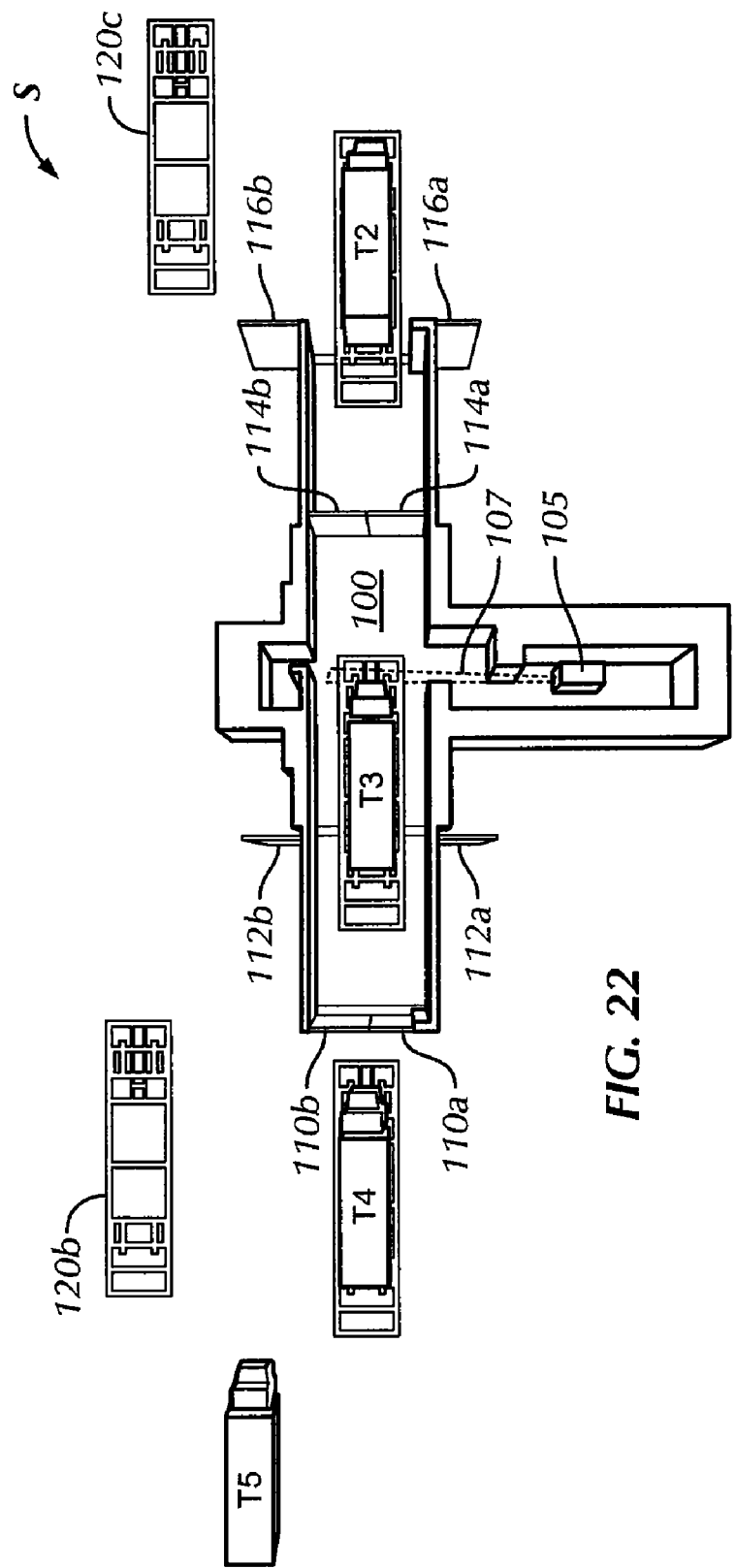

In FIG. 21, door 110 is closing, while door 112 is fully open and truck T3 is passing the plane of door leaves 112a and 112b. Door 114 is closed, while truck T2 exits tunnel 100 through door 116. FIG. 22 then shows truck T4 moving towards load position 150, while truck T3 is being scanned, and while truck T2 finishes leaving the tunnel 100. Empty carriers 120b and 120c are now being positioned for other trucks, such as waiting truck T5.

Figure 23:
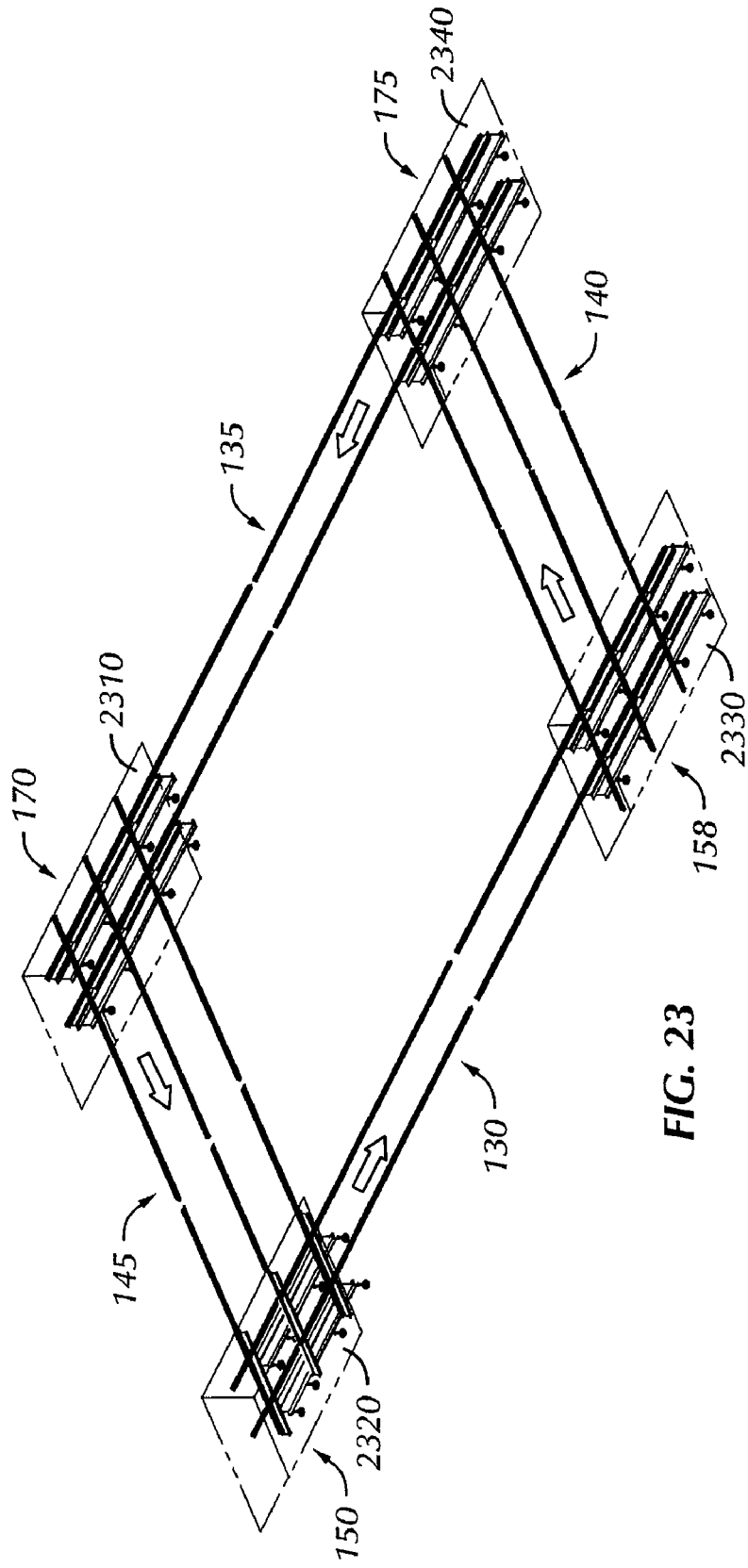
FIG. 23 is a perspective view illustrating the rails and lowerator pits of the system S.

FIG. 23 is a perspective view illustrating the rails and pits at the lowerator stations of the system S. Pits 2310-2340 provide mounting space for lowerators and access underneath the rails for maintenance. As described previously, trucks or other container transporters are loaded onto a carrier 120 at primary load station 170. The carrier 120 is then lowered by a lowerator (not shown in FIG. 23, and as described below with respect to FIGS. 34-41) onto transverse rails 145 and side transferred to station 150. At station 150, carrier 120 is again lowered to the level of rails 130 for passage through the scanning tunnel 100 (not shown). At station 158, the carrier 120 is again lowered to the level of transverse rails 140 and side-transferred to primary unload station 175. As noted before, stations 150 and 158 can serve as secondary load and unload stations, if necessary or desired.

FIG. 24 is a top view illustrating an exemplary placement of friction motor drives in the system S. Motor drives 2400a-2400p are spaced along and between rails 130. Motor drives 2410a-2410j are similarly spaced along and between rails 135. Motor drives 2420a-2420h and 2430a-2430h are spaced along the outside of rails 145 for transverse movement. Likewise, motor drives 2440a-2440h and 2450a-2450h are spaced along rails 140 for opposite transverse movement. These motor drives are described in more detail below. The spacing and number of drives 2400, 2410, 2420, 2430, 2440, and 2450 in FIG. 24 are illustrative and exemplary only, and other numbers and arrangements can be used.

Figure 25:
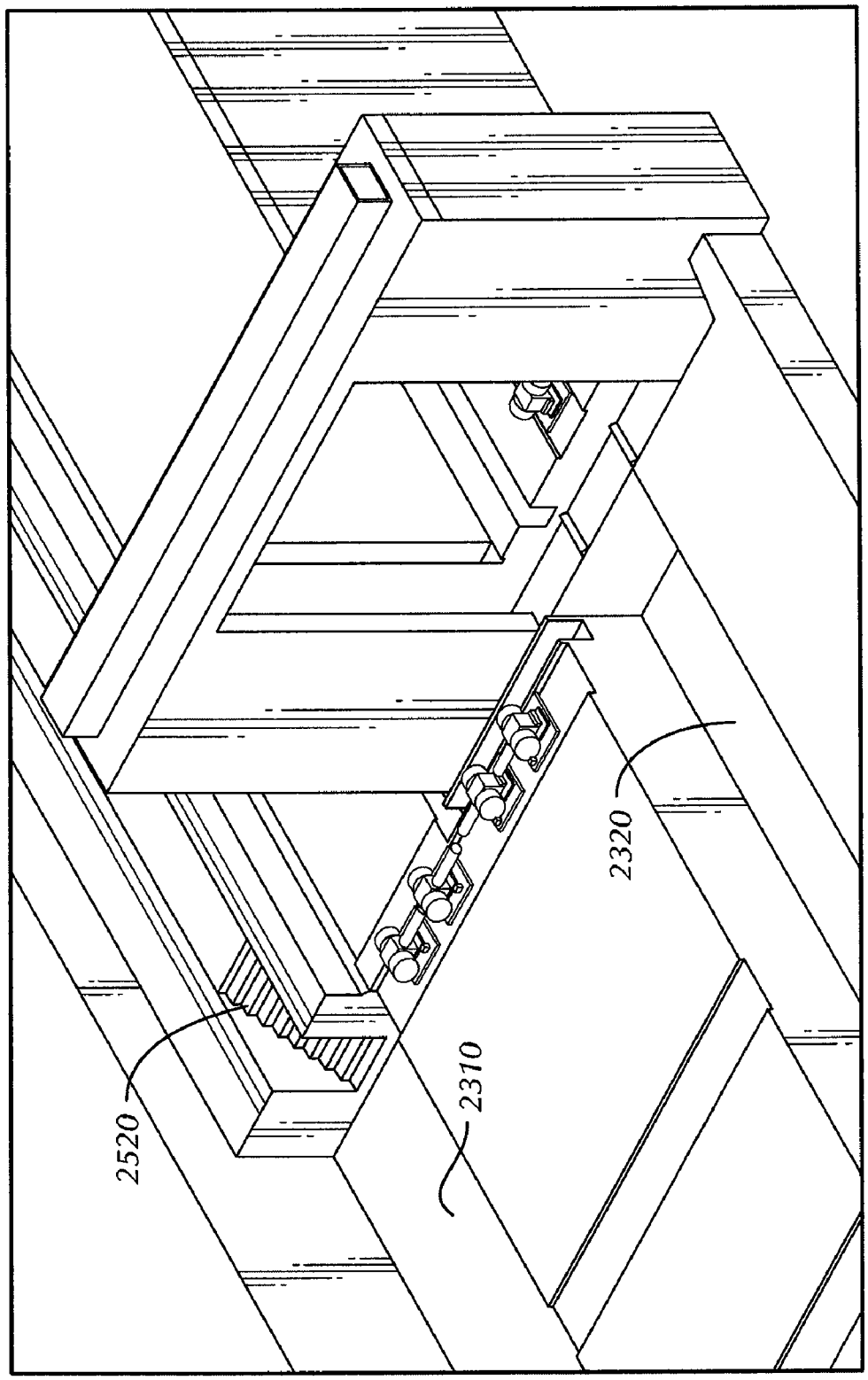
FIG. 25 is a perspective view illustrating the load end of the system S without the rails.

As described above with respect to FIG. 23, the system S provides access pits at load station 170, process station, process station 150, process station 158, and unload station 175. These pits allow personnel access for maintenance and other purposes to the lowerators used to lower and raise the carriers 120, which are positioned in these pits underneath the rails 130 and 135, as described in detail below with respect to FIGS. 34-41. As shown in FIG. 25, stairs 2520 provide entry to the floor level of pits 2310 and 2320 from the rail level. Pits 2310 and 2320 can be connected to each other, as can pits 2330 and 2340, allowing maintenance personnel to walk from one to the other.

Figure 26A:
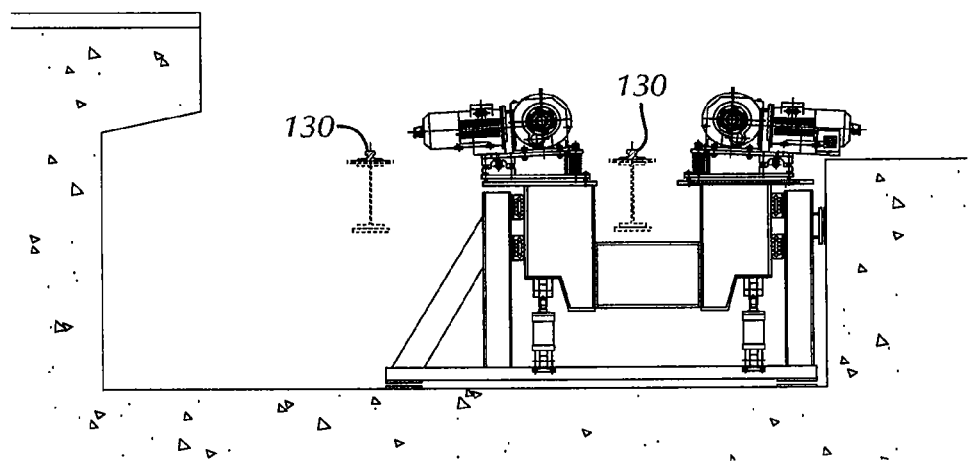
FIG. 26a is a detail cross-sectional view along line V-V of FIG. 24.
Figure 26B:
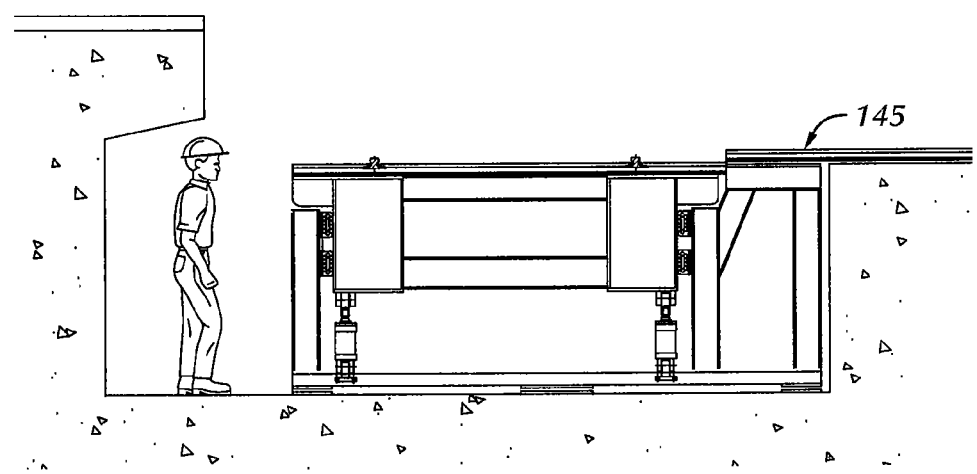
FIG. 26b is a detail cross-sectional view along line W-W of FIG. 24.
Figure 27:
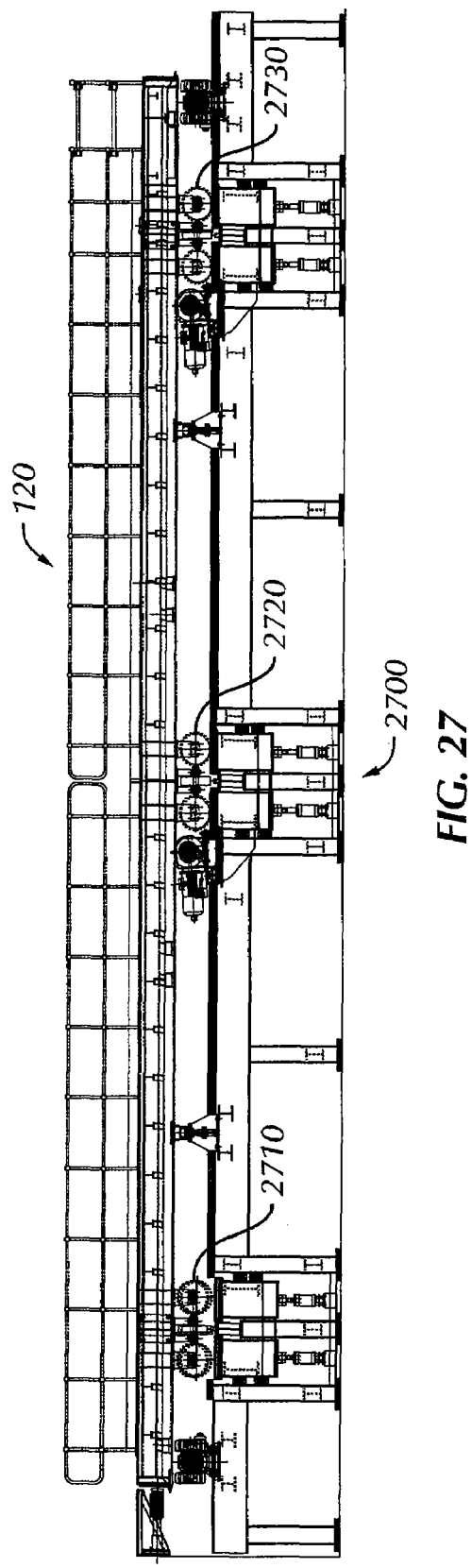
FIG. 27 is a side view illustrating a lowerator at the primary loading station of the system S.
Figure 28:
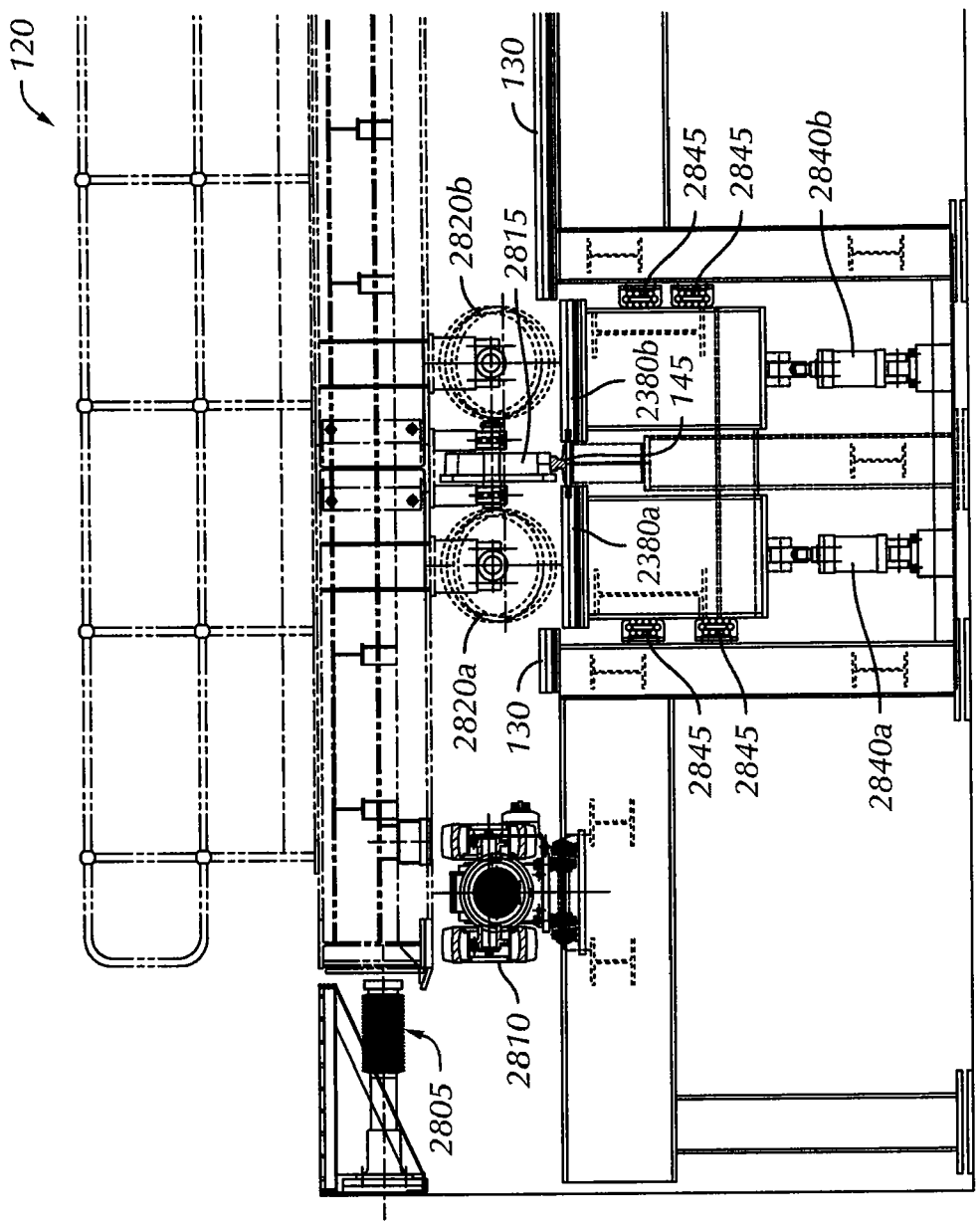
FIGS. 28, 29, and 30 are enlarged portions of FIG. 27.

FIGS. 26a and 26b show cross-section views of the system S along lines V-V and W-W, respectively, showing placement of the lowerators in pit 2310. FIG. 27 is a side view of lowerator 2700 at station 170. As shown in FIG. 27, bogies 2710, 2720 and 2730 of the carriers 120 include wheels for both longitudinal and transverse movement. Turning to FIG. 28, an enlarged view of the left most portion and bogie 2710 of FIG. 27 illustrates a number of features. A bumper 2805 prevents damage to an end of the carrier 120. A motor drive unit 2810 provides transverse motive power for the carrier 120 when lowered to the rails 145 from rails 135. Wheels 2820a and 2820b are standard railroad wheels, for travel along longitudinal rails 130 and 135. Wheel 2815 is also a standard wheel, but is mounted for transverse movement. Additional wheels for the second rail of each longitudinal pair of rails, as with conventional rail road bogies, but not visible in this view. To lower the carrier 120, hydraulic pistons 2840a and 2840b lower short rail sections 2830a and 2830b for the longitudinal wheels of the bogie 2710. FIG. 28 shows these rail sections lowered, allowing wheel 2815 to contact rail 145 for transverse movement. Motor unit 2810 will then be pivoted upwards so that the wheels engage the under surface of carrier 120. Skates 2845, in one embodiment caterpillar action skates manufactured by Dorvic Engineering Ltd., provide stability during upward and downward movement of the carrier 120. When in the lowered position, rail sections 2830a and 2830b are below wheels 2920a and 2820b, allowing the wheels 2820 to pass above those rail sections when moved transversely.

Figure 29:
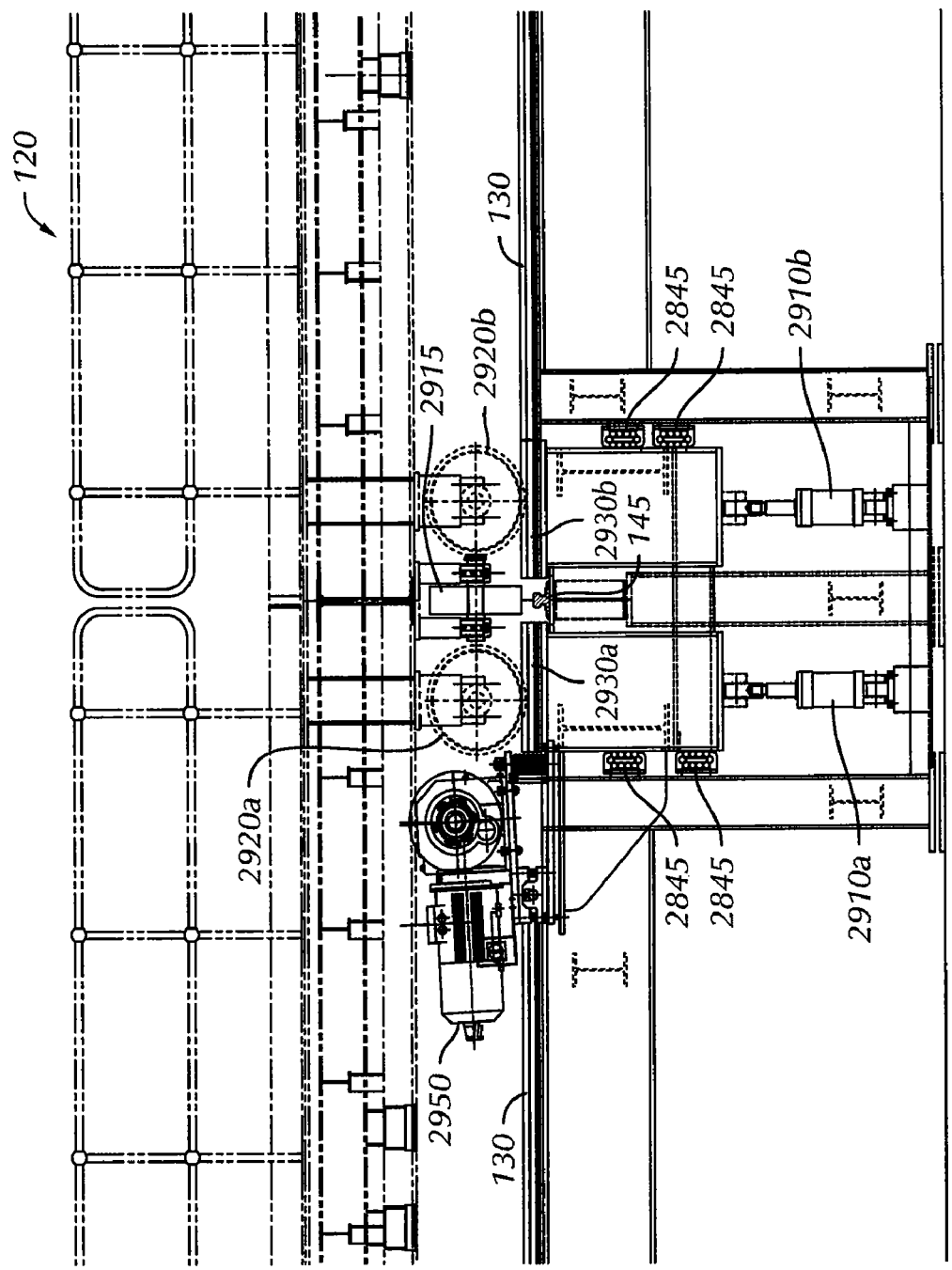
Figure 30:
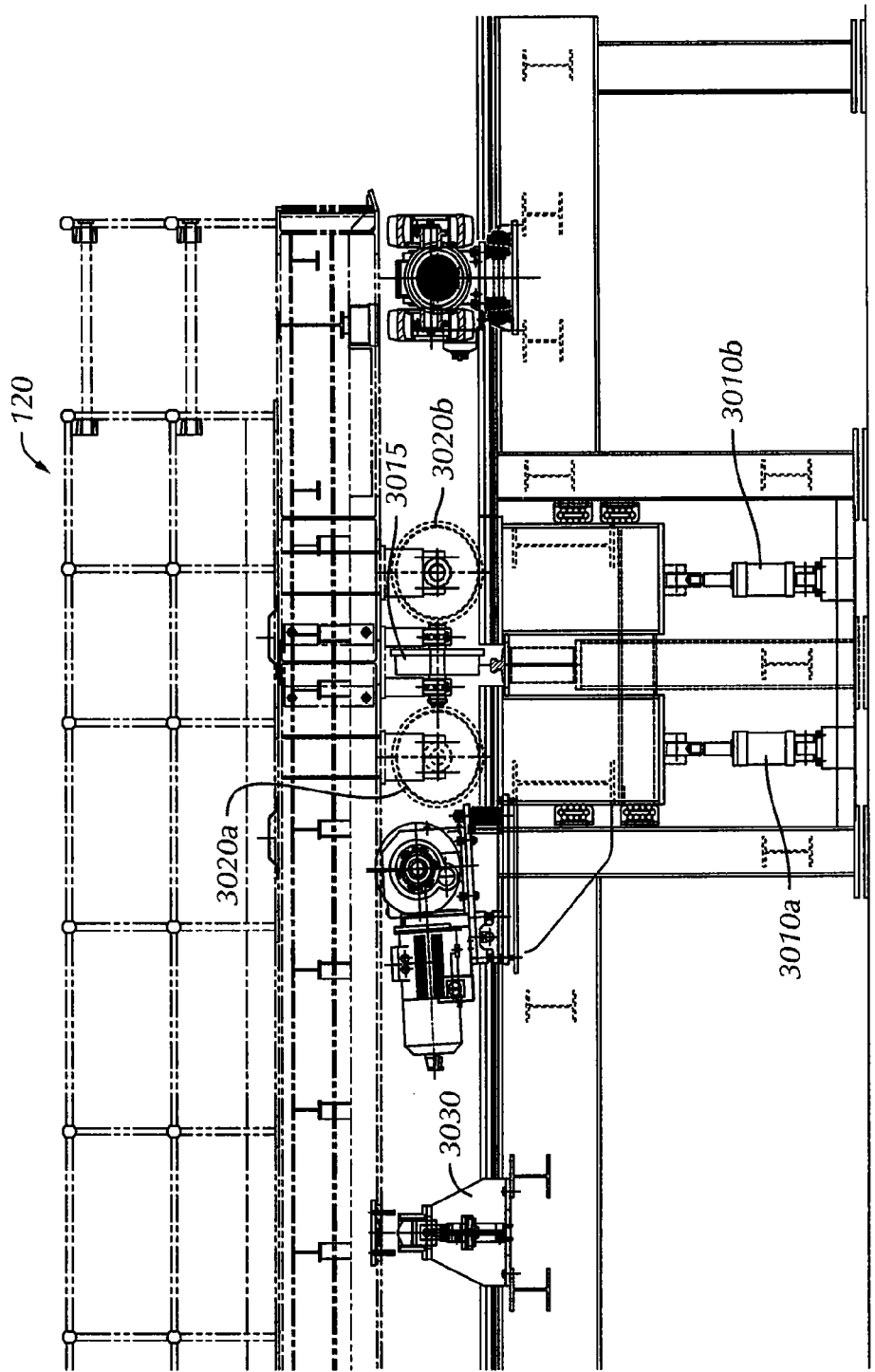

FIG. 29 is an enlarged view of a middle portion of the carrier 120 and bogie 2720. A friction motor drive unit 2950, described in more detail below, provides motive power for longitudinal movement. As with FIG. 28, pistons 2910a and 2910b extend and retract to raise and lower short longitudinal rail sections 2930a and 2930b to variously engage with wheels 2920a and 2920b or transverse wheel 2915. As shown in FIG. 29, transverse wheel 2915 does not use a wheel flange on either side of middle transverse rail 145. Again, skates 2845, provide sideways stability for the lowerator during lifting and raising. As shown in FIG. 29, the lowerator 2700 is in the raised position, allowing wheels 2920a-2920b to roll along rail 130 for longitudinal movement. Retracting pistons 2910a and 2910b lowers rail sections 2930a and 2930b, as well as drive unit 2950, disengaging motor drive unit 2950 from the carrier 120. FIG. 30 shows the other end of carrier 120, with pistons in their extended position, allowing wheels 3020a and 3020b to roll along rails 135. A shot bolt 3030 can be used to lock the carrier 120 into place to prevent longitudinal movement while loading the carrier 120.

Figure 31:
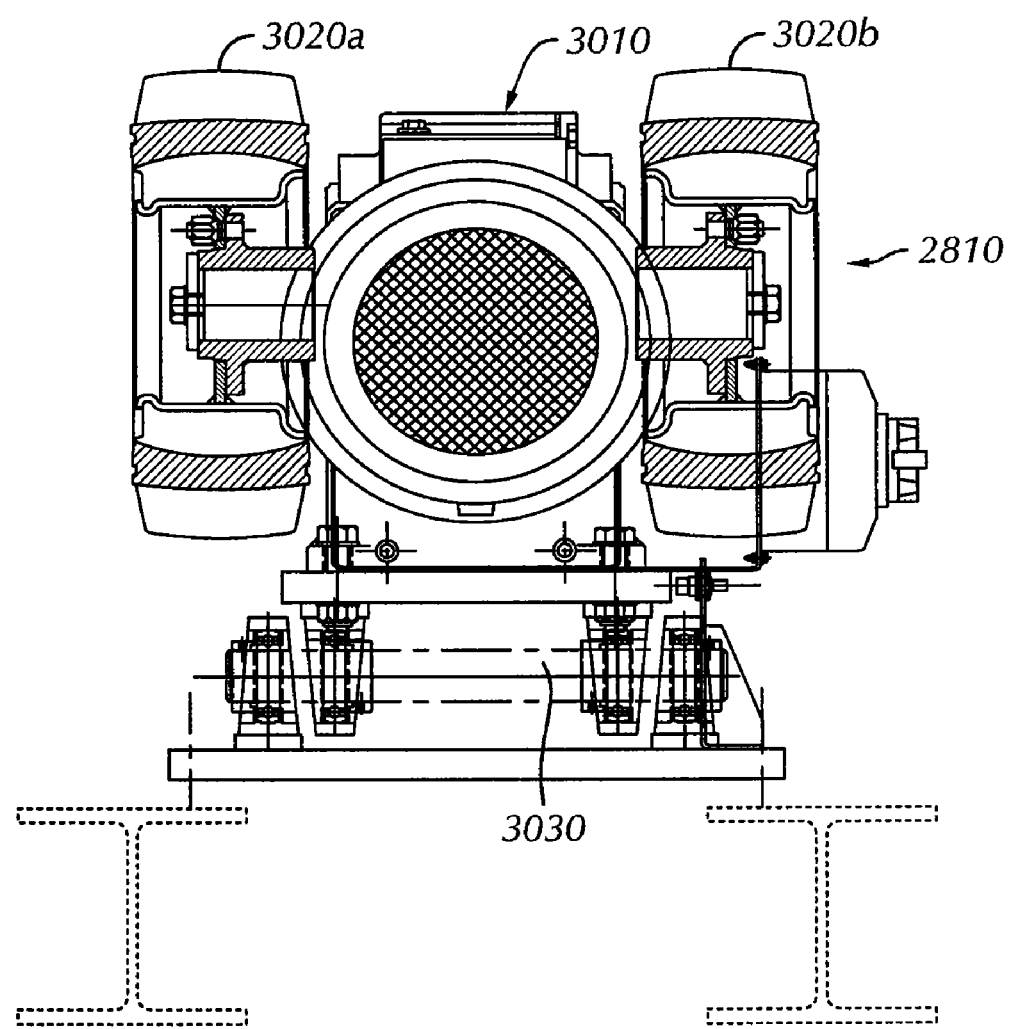
FIG. 31 is enlarged view of a transverse motor drive unit illustrated in FIG. 27.

FIG. 31 provides an enlarged view of transverse friction motor drive 2810, corresponding to drives 2420 and 2430 of FIG. 24. Wheels 3020a and 3020b use elastomeric tires for friction drive and are powered by motor 3010. Motor drive 2810 pivots on axle 3030, allowing the wheels 3020a and 3020b to move up and down as necessary for maintaining contact with the carrier 120. A spring (not shown) vertically positions the wheel end of the motor drive, as described below in the description of FIG. 33.

Figure 32:
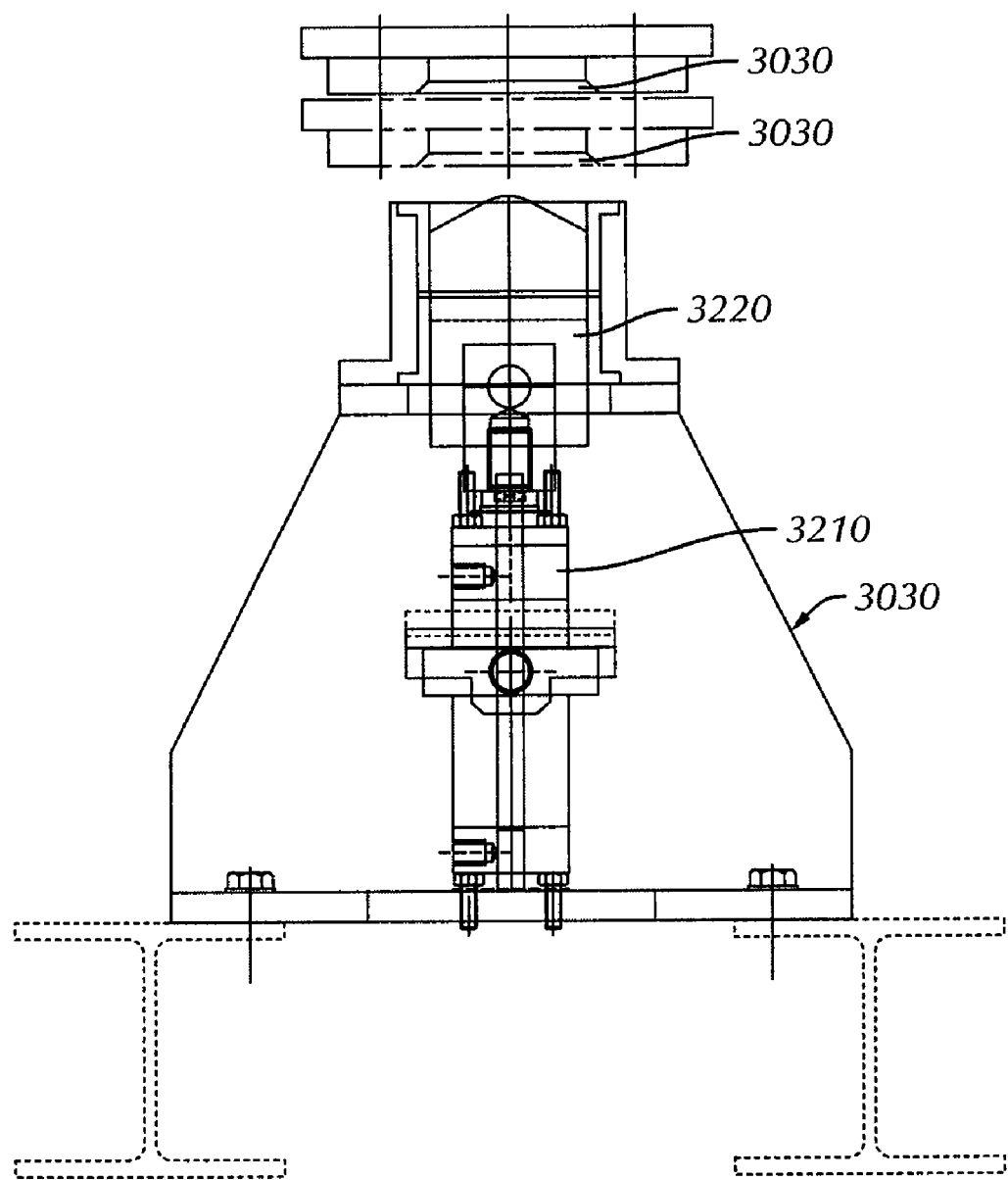
FIG. 32 is an enlarged view of a shot bolt illustrated in FIG. 27.

FIG. 32 is an enlarged view of the shot bolt 3030 of FIG. 30. Actuator 3210 can be extended or retracted, to engage bolt 3220 with a formation 3230 on the underside of carrier 120. FIG. 32 shows formation 3230 in both a raised and lowered position, corresponding to raised and lowered positions of the carrier 120. The use and configuration of shot bolt 3030 is exemplary and illustrative of shot bolts 3030 can be used. Other techniques can be used to hold the carrier 120 in place, and other configurations of shot bolts can be used.

Figure 33:
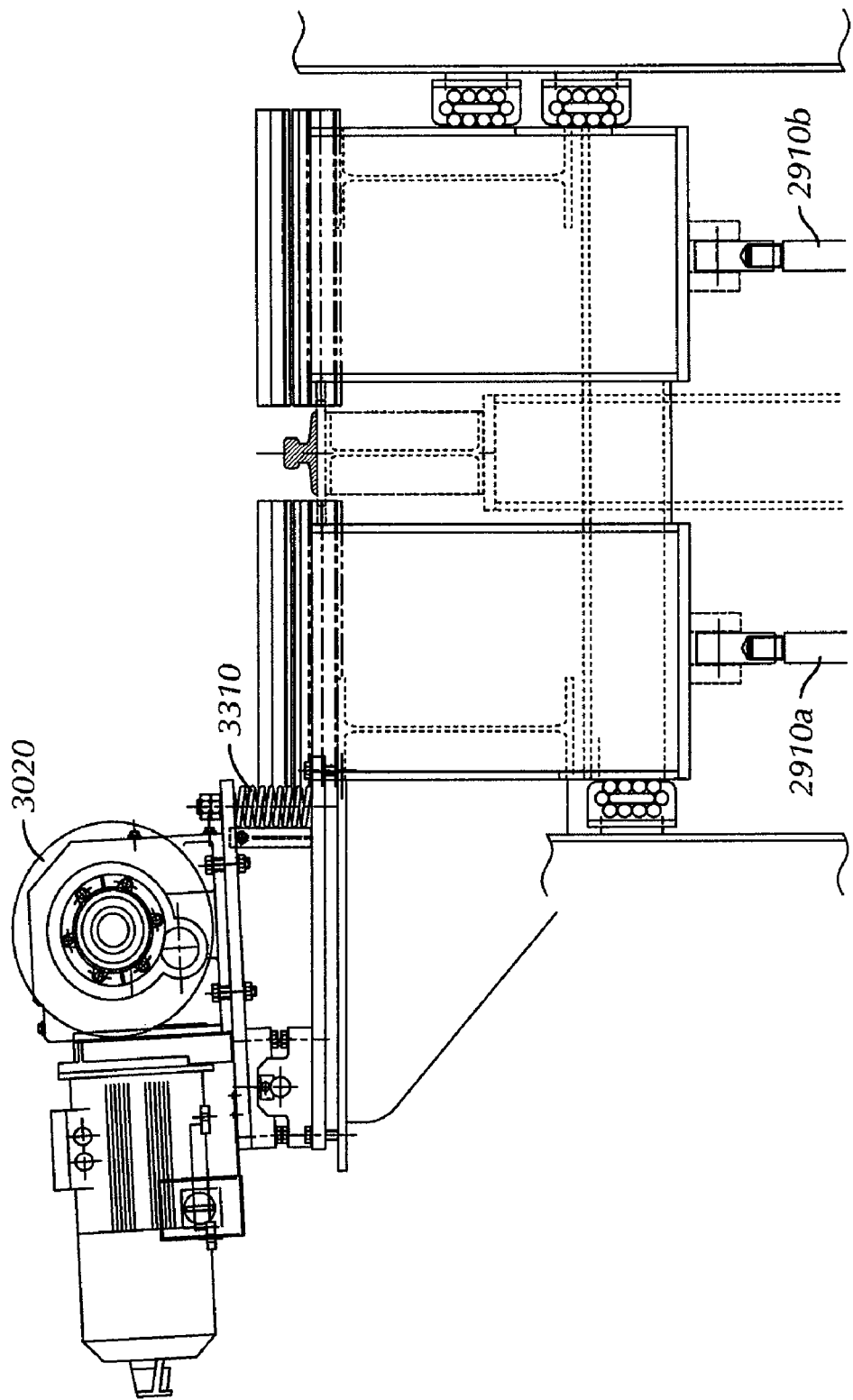
FIG. 33 is an expended view of a longitudinal motor drive unit illustrated in FIG. 27.

FIG. 33 is an enlarged side view of motor drive unit 2950 of FIG. 29. Motor drive 2950 is identical in construction to drive 2810 shown in FIG. 31. In this view, spring 3310 is shown, allowing the wheels 3020 to move up and down as needed. However, drive unit 2950 is longitudinally mounted between the longitudinal rails. In addition, although most of the longitudinal motor drives are fixed to the floor between the rails, drive unit 2950 is mounted so that extending pistons 2910a and 2910b raises and lowers motor drive 2950, allowing it to engage or disengage the underside of carrier 120 as desired.

Figure 34:
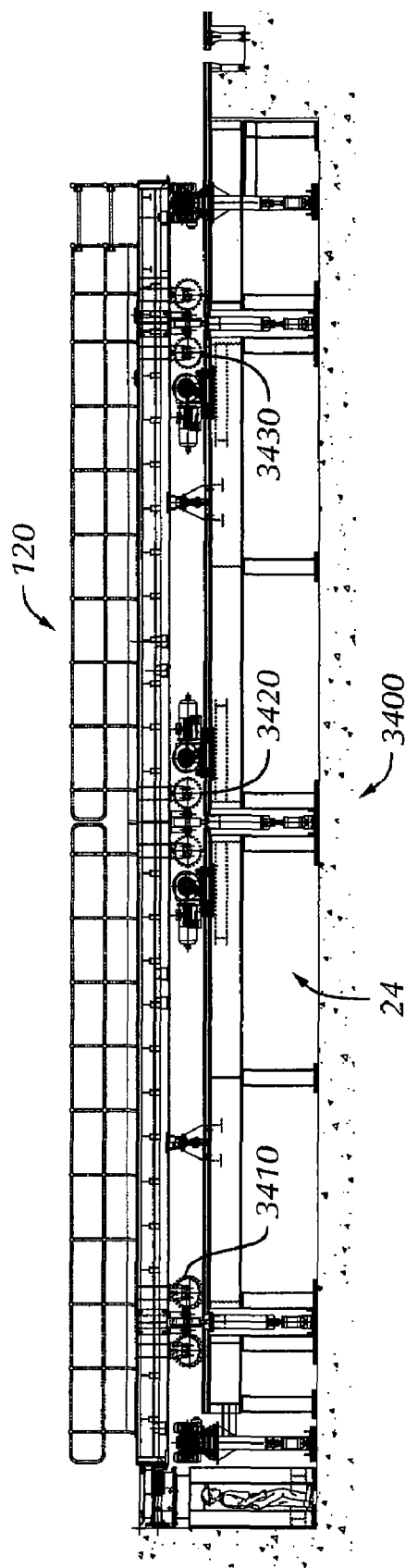
FIG. 34 is a side view illustrating a lowerator at the secondary loading station of the system S.

FIG. 34 is a side view of the lowerator 3400 at process stations 150 of FIG. 1. As with the lowerator 2700 of FIG. 27, lowerator 3400 lowers the carrier 120 from transverse rails 145 to rails 130. Unlike lowerator 2700, however, the lowerator 3400 lowers the carrier on the transverse wheels of bogies 3410, 3420 and 3430, as shown in enlarged FIGS. 35, 36 and 37. Note that lowerator 3400 is mounted underneath the rails 130 in pit 2320.

Figure 35:
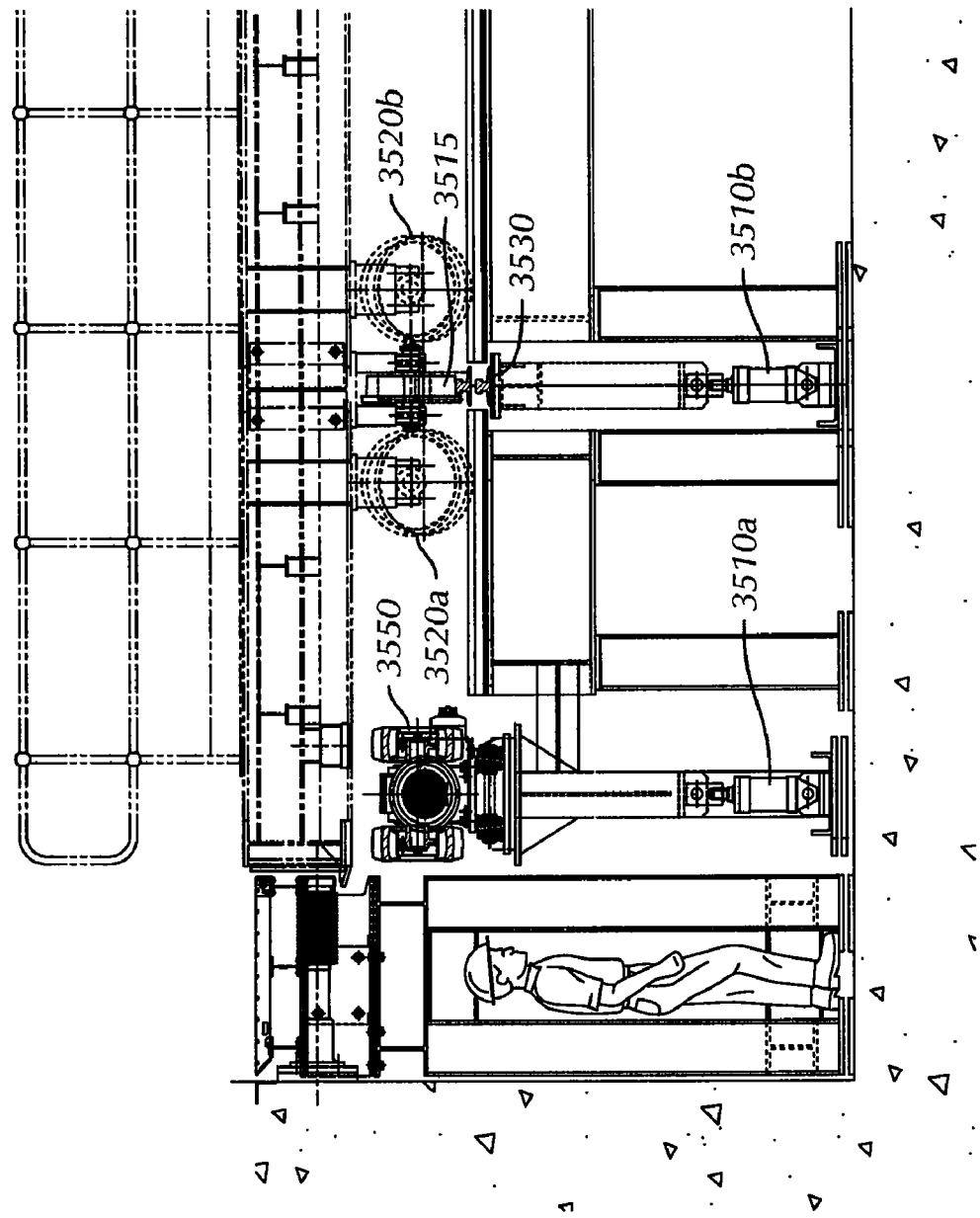
FIGS. 35, 36 37, 38, and 39 are enlarged views of portions of FIG. 34.
Figure 36:
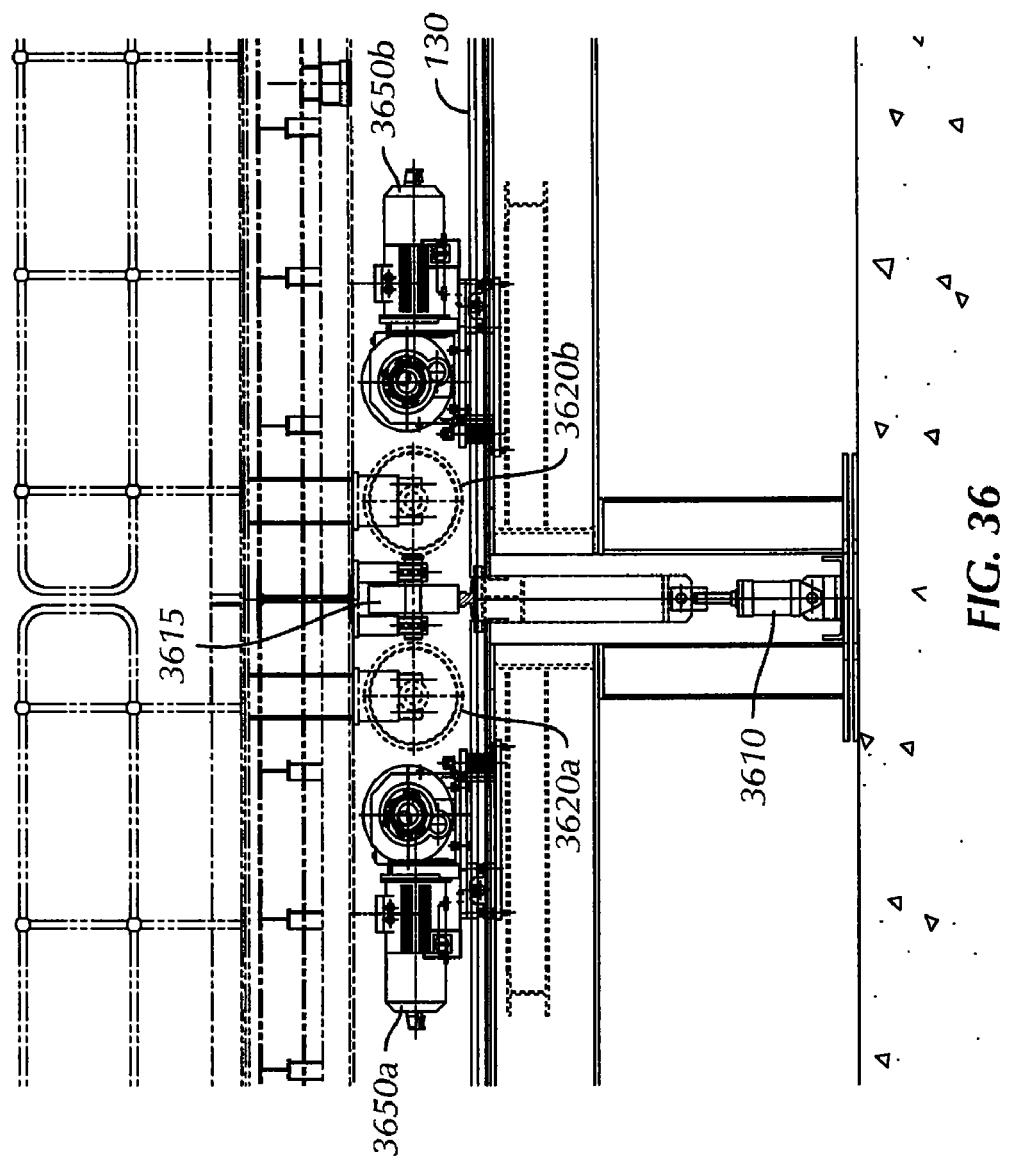
Figure 37:
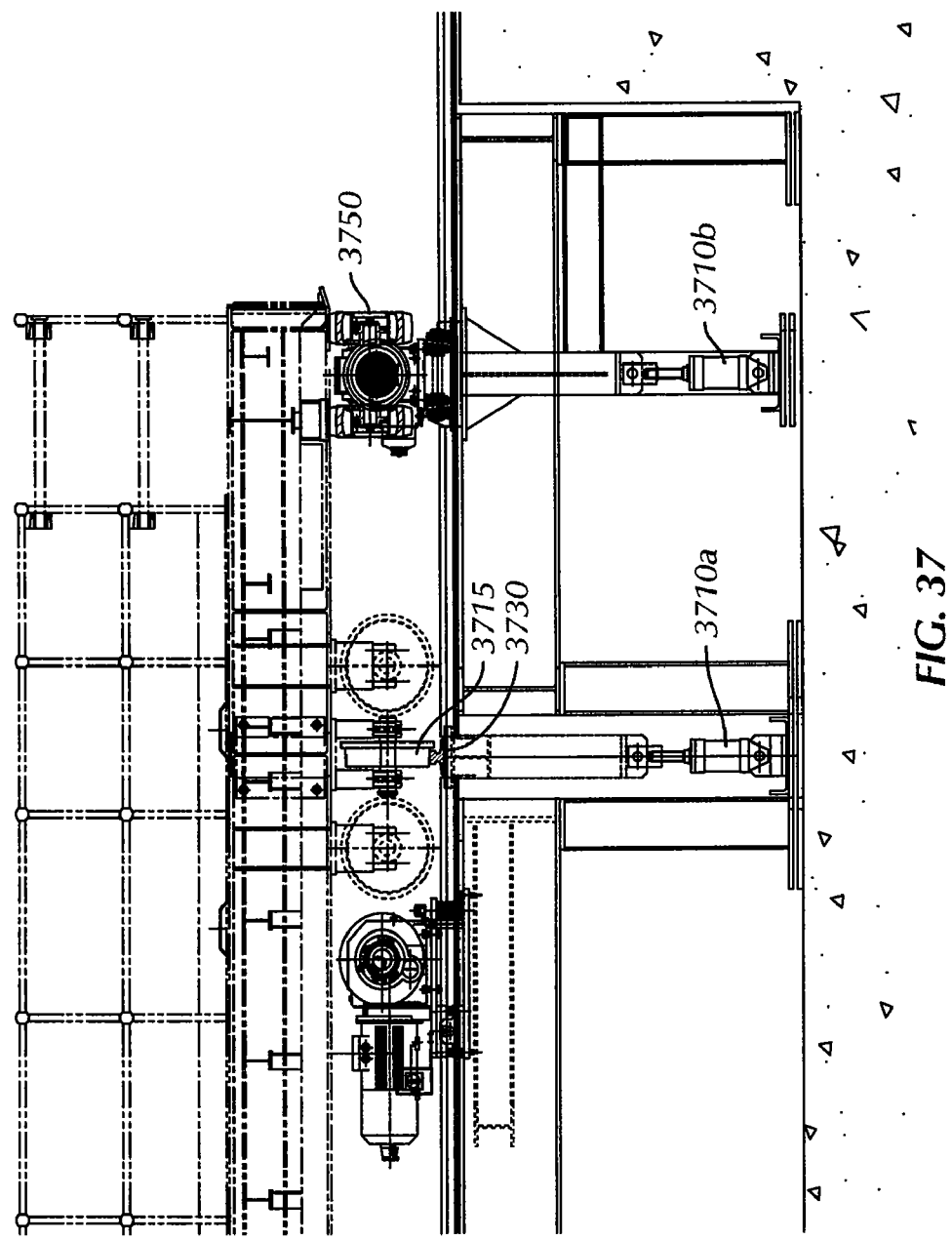

Enlarged FIG. 35 shows that piston 3510a of lowerator 3400 lowers drive unit 3550 away from carrier 120. Piston 3510b lowers a small section of rail 3530, lowering the carrier onto rails 130. As piston 3520b lowers rail section 3530 below the level of rail 130, wheels 3520a and 3520b engage rails 130, while wheel 3515 disengages from rail 145. Enlarged FIG. 36 correspondingly illustrates piston 3610, which lowers middle wheel 3615 until wheels 3620a and 3620b engage rails 130. Motor drive units 3650a and 3650b are shown pivoted into compressed configurations as they would be when engaged with the carrier 120 for moving the carrier 120 along rails 130. Likewise, enlarged FIG. 37 shows pistons 3710a and 3710b lowering wheel 3715 and drive unit 3750.

Figure 38:
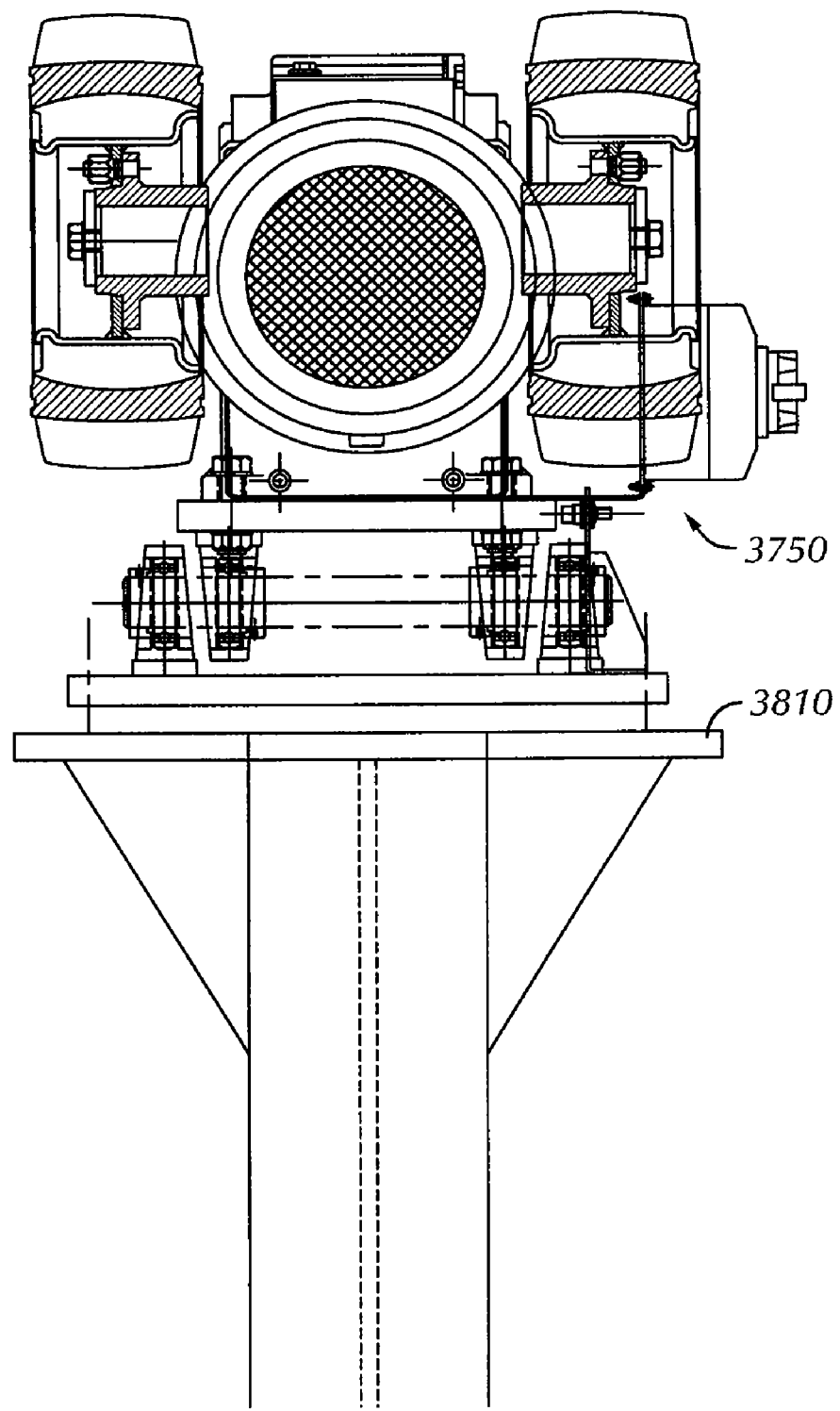
Figure 39:
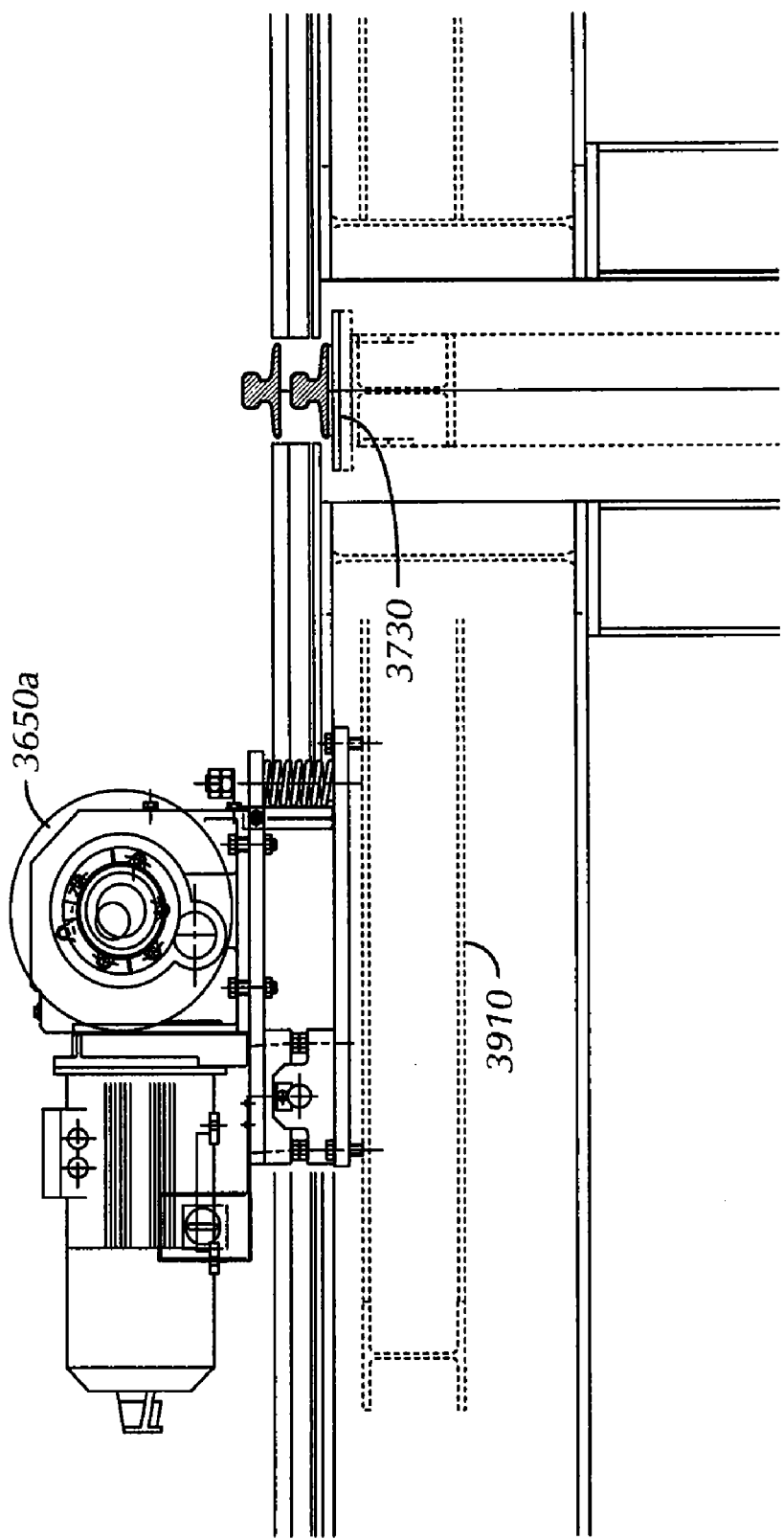

FIG. 38 illustrates motor drive unit 3750 mounted on a platform 3810, which can then be lowered and raised by piston 3710b. FIG. 39 illustrates drive unit 3650a, which is mounted on a fixed structure 3910 next to the rail section 3730 lowered by piston 3610.

Figure 40:
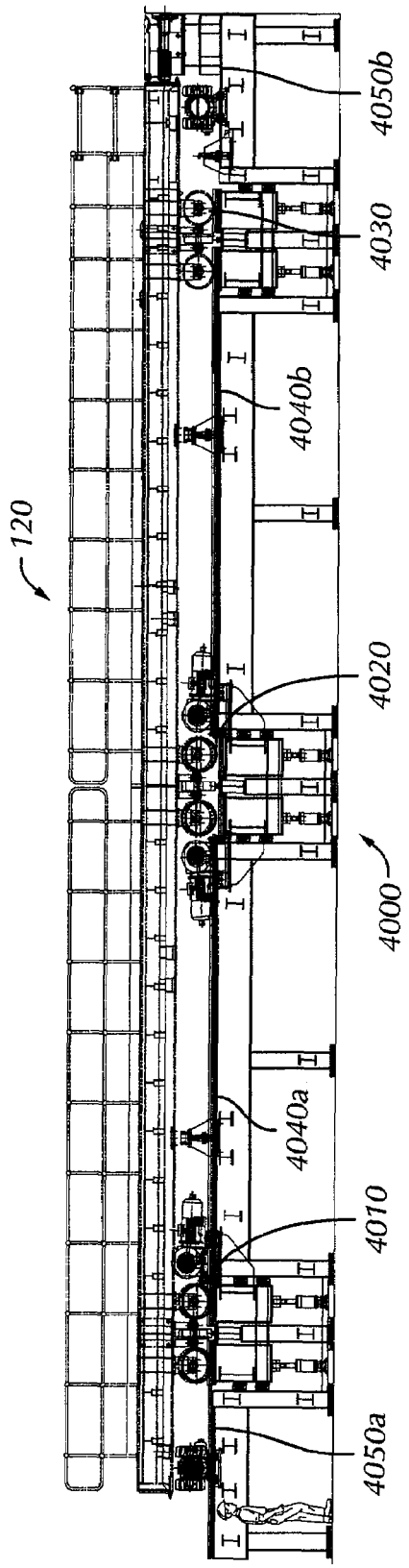
FIG. 40 is a side view illustrating a lowerator at the secondary unloading station of the system S.
Figure 41:
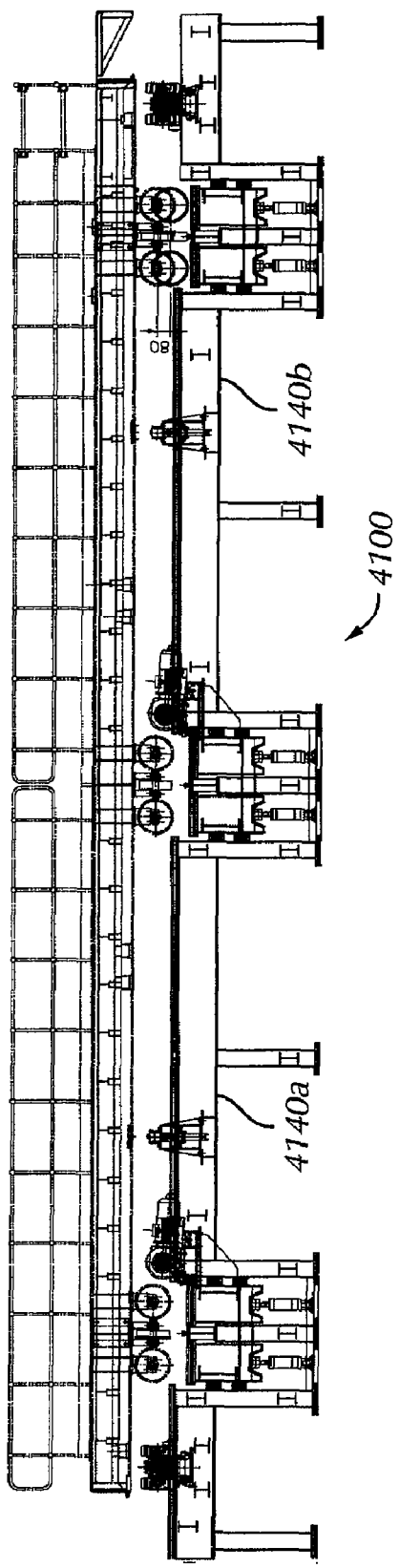
FIG. 41 is a side view illustrating a lowerator at the primary unloading station of the system S.

FIGS. 40 and 41 illustrate lowerators 4000 and 4100, located at stations 158 and 175 respectively. Lowerator 4000 is similar in structure to lowerator 2700, lowering carrier 120 onto transverse rails 140. Shot bolts 4040a and 4040b lock carrier 120 in place during operation of lowerator 4000. Lowerator 4100 is the only lowerator that raises carrier 120, raising it to the level of rails 135 by the sum of the distances the carrier 120 was lowered by lowerators 2700, 3400, and 4000. Otherwise, the technique and structural elements are the same as described above. By lowering carrier 120 with lowerators 2700, 3400, and 4000, then raising carrier 120 with lowerator 4100, the system S avoids raising a loaded carrier 120. Shot bolts 4140a and 4140b allow locking the carrier in place during operation of the lowerator 4100.

The foregoing disclosure and description of the invention are illustrative and explanatory thereof, and various changes in the details of the illustrated apparatus and construction and the method of operation may be made without departing from the spirit of the invention.

We claim:

1. A system, comprising:
   a scanning tunnel having an entrance and an exit;
   a plurality of scanning entrance doors, each having an open position and a closed position, at least one of the plurality of scanning entrance doors interior to the scanning tunnel;
   a plurality of scanning exit doors, each having an open position and a closed position, at least one of the plurality of scanning exit doors interior to the scanning tunnel;
   a scanner, adapted to scan the contents of a container inside the scanning tunnel with X-rays when at least one of the plurality of scanning entrance doors is in the closed position and at least one of the plurality of scanning exit doors is in the closed position;
   a conveyor system, adapted to convey a carrier carrying the container through the tunnel, comprising:
       a first longitudinal section extending through the scanning tunnel;
       a second longitudinal section exterior to the tunnel, offset in elevation from the first longitudinal section; and
       means for transferring the carrier between the first longitudinal section and the second longitudinal section.

2. The system of claim 1, further comprising:
   a plurality of friction drive units, operatively coupled to the carrier for moving the carrier through the scanning tunnel, each comprising:
       an electric motor; and
       an elastomeric wheel mounted on the electric motor, the elastomeric wheel providing friction drive power to the carrier.

3. The system of claim 2, wherein some of the plurality of friction drive units can be raised and lowered to alternately engage and disengage with the carrier.

4. The system of claim 3, at least one of the plurality of friction drive units further comprising:
   an independent friction drive encoder, positioned under the carrier while driving the carrier,
   whereby carrier speed can be regulated.

5. The system of claim 2, the electric motor pivotally mounted, such that the wheel can be raised and lowered.

6. The system of claim 2, each of the plurality of friction drive units further comprising:
   a spring coupled to one end of the electric motor and a mounting platform for the electric motor, adapted for movable vertical positioning of the elastomeric wheel.

7. The system of claim 1, wherein the conveyor system returns the carrier from the exit to the entrance exterior to the tunnel.

8. The system of claim 1, the means for transferring the carrier from the first longitudinal section to the second longitudinal section comprising:
a first transverse section offset in elevation from the first longitudinal section and the second longitudinal section; and
a second transverse section offset in elevation from the first longitudinal section and the second longitudinal section.

9. The system of claim 8,
wherein the first transverse section is offset in elevation from the first longitudinal section by a first predetermined distance, and
wherein the second longitudinal section is offset in elevation from the first transverse section by a second predetermined distance.

10. The system of claim 8, wherein the second transverse section is offset in elevation from the first longitudinal section, the second longitudinal section, and the first transverse section.

11. The system of claim 8, wherein the second transverse section is offset in elevation from the second longitudinal section by a third predetermined distance.

12. The system of claim 8, the conveyor system further comprising:
a plurality of lowerators, comprising:
a first lowerator, adapted to move the carrier from the first longitudinal section to the first transverse section;
a second lowerator, adapted to move the carrier from the first transverse section to the second longitudinal section;
a third lowerator, adapted to move the carrier from the second longitudinal section to the second transverse section; and
a fourth lowerator, adapted to move the carrier from the second transverse section to the second longitudinal section.

13. The system of claim 12, each of the plurality of lowerators comprising:
a plurality of pistons, each of which has an extended position and a retracted position; and
a plurality of platforms, each mounted on one of the plurality of pistons,
whereby the plurality of platforms can be raised and lowered.

14. The system of claim 12,
the carrier comprising:
a wheel for longitudinal movement; and
a wheel for transverse movement; and
each of the plurality of lowerators comprising:
means for raising and lowering a short section of track, alternately engaging the wheel for longitudinal movement and the wheel for transverse movement.

15. A method, comprising:
moving a first carrier carrying a container through a scanning tunnel comprising:
a scanning location interior to the tunnel;
a first door at an entrance to the tunnel;
a second door positioned between the first door and the scanning location;
a third door at an exit to the tunnel; and
a fourth door positioned between the third door and the scanning location;
irradiating the container at the scanning location with X-rays only if one of the first door and the second door is in a closed position and only if one of the third door and fourth door is in a closed position; and
conveying the first carrier, comprising:
conveying the first carrier to the entrance from a first position exterior to the tunnel and offset in elevation from the entrance;
conveying the first carrier from the entrance to the exit of the tunnel;
conveying the first carrier from the exit to a second position; and
conveying the first carrier from the second position to the first position.

16. The method of claim 15, moving the first carrier through a scanning tunnel comprising:
opening the first door;
moving the first carrier through the first door into the tunnel; and
closing the first door when the first carrier is entirely within the tunnel.

17. The method of claim 15, moving the first carrier through a scanning tunnel further comprising:
opening the second door;
moving the first carrier through the second door; and
closing the second door when the first carrier is past the second door; and
reopening the first door when the second door is closed.

18. The method of claim 15, moving the first carrier through a scanning tunnel comprising:
opening the fourth door;
moving the first carrier through the fourth door; and
closing the fourth door when the first carrier is past the fourth door.

19. The method of claim 15, moving the first carrier through a scanning tunnel further comprising:
opening the third door;
moving the first carrier out of the tunnel through the third door; and
closing the third door when the first carrier is past the third door.

20. The method of claim 15, conveying the first carrier to the entrance from a first position exterior to the tunnel and offset in elevation from the entrance comprising:
loading the first carrier at a loading station;
adjusting the elevation of the first carrier; and
transversely moving the first carrier in a straight path from the loading station to the entrance of the scanning tunnel.

21. The method of claim 15, conveying the first carrier from the exit to a second position comprising:
transversely moving the first carrier in a straight path from the exit of the scanning tunnel to an unloading station, offset in elevation from the exit;
adjusting the elevation of the first carrier; and
unloading the container from the first carrier at the unloading station.

22. The method of claim 15, conveying the first carrier from the second position to the first position comprising:
moving the first carrier from the unloading station to the loading station.

23. The method of claim 15, further comprising:
moving a second carrier into the scanning tunnel before the first carrier exits the scanning tunnel.

24. The method of claim 15, further comprising:
moving a second carrier through the first door while irradiating the first carrier at the scanning location.

25. The method of claim 15, further comprising:
moving a second carrier through the third door while irradiating the first carrier at the scanning location.

26. The method of claim 15, further comprising:
providing motion power to the first carrier from a plurality of friction drive units.

27. A system, comprising:
 a scanning tunnel;
 a scanner, adapted to scan a carrier inside the scanning tunnel; and
 a conveyor system, comprising:
  a first section extending through the tunnel;
  a second section exterior to the tunnel, offset in elevation from the first section;
  a first subsystem, adapted to adjust the elevation of the carrier and to move the carrier from the first section to the second section; and
  a second subsystem, adapted to adjust the elevation of the carrier and to move the carrier from the second section to the first section.

28. The system of claim 27, the first subsystem comprising:
 a transverse section, offset in elevation from the first section and the second section;
 a first lowerator, adapted to adjust the elevation of the carrier and to move the carrier from the first section to the transverse section; and
 a second lowerator, adapted to adjust the elevation of the carrier and to move the carrier from the transverse section to the second section.

29. The system of claim 28, the first lowerator and the second lowerator each comprising:
 a short section of track;
 a piston, adapted to raise and lower the short section of track.

30. The system of claim 28, the carrier comprising:
 a first wheel adapted for movement along the first section and the second section; and a second wheel adapted for movement along the transverse section,
 wherein the first lowerator and the second lowerator each alternately engage the first wheel and the second wheel.

31. The system of claim 27, the first subsystem comprising:
 a transverse section, offset in elevation from the first section and the second section;
 a first lowerator, adapted to adjust the elevation of the carrier and to move the carrier from the second section to the transverse section; and
 a second lowerator, adapted to adjust the elevation of the carrier and to move the carrier from the transverse section to the first section.

32. The system of claim 31, the first lowerator and the second lowerator each comprising:
 a short section of track;
 a piston, adapted to raise and lower the short section of track.

33. The system of claim 31, the carrier comprising:
 a first wheel adapted for movement along the first section and the second section; and
 a second wheel adapted for movement along the transverse section,
 wherein the first lowerator and the second lowerator each alternately engage the first wheel and the second wheel.

34. The system of claim 27, the scanning tunnel further comprising:
 a plurality of entrance doors, at least one of the plurality of entrance doors interior to the scanning tunnel;
 a plurality of exit doors, at least one of the plurality of exit doors interior to the scanning tunnel;
 an interlock system that prevents operation of the scanner unless at least one of the plurality of entrance doors and at least one of the plurality of exit doors are in a closed position.

35. The system of claim 27, the first section and the second section each comprising:
 a friction drive unit, operatively coupled to the carrier for moving the carrier, comprising:
  a motive power source;
  an elastomeric wheel, driven by the motive power source, the elastomeric wheel providing friction drive power to the carrier.

36. The system of claim 35, wherein the friction drive unit can be adjusted to alternately engage and disengage with the carrier.

* * * * *